(12) United States Patent
Kokojima et al.

(10) Patent No.: US 7,031,830 B2
(45) Date of Patent: Apr. 18, 2006

(54) GUIDANCE INFORMATION PROVIDING APPARATUS, SERVER APPARATUS, GUIDANCE INFORMATION PROVIDING METHOD, AND PROGRAM PRODUCT

(75) Inventors: Yoshiyuki Kokojima, Kawasaki (JP);
Hiroshi Sugiyama, Kawasaki (JP);
Kenichi Kameyama, Kawasaki (JP);
Miwako Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 10/743,829

(22) Filed: Dec. 24, 2003

(65) Prior Publication Data

US 2004/0193369 A1   Sep. 30, 2004

(30) Foreign Application Priority Data

Dec. 26, 2002 (JP) ............................. 2002-378447
Dec. 22, 2003 (JP) ............................. 2003-423977

(51) Int. Cl.
*G06T 15/70* (2006.01)
*G01C 21/30* (2006.01)

(52) U.S. Cl. ................. 701/209; 701/210; 701/211; 340/995.24; 345/419

(58) Field of Classification Search ............. 701/209, 701/201, 202, 208, 210, 211, 212; 340/995.14–995.27, 340/345; 345/473, 419, 854, 848
See application file for complete search history.

(56) References Cited

U.S. PATENT DOCUMENTS 6,360,168 B1 * 3/2002 Shimabara ................. 701/211

6,871,143 B1 * 3/2005 Fujiwara ..................... 701/211
2001/0040505 A1 * 11/2001 Ishida et al. ................ 340/435
2002/0010543 A1 * 1/2002 Watanabe et al. ........... 701/211

FOREIGN PATENT DOCUMENTS

| JP | 10-170301 | 6/1998 |
| JP | 2001-273526 | 10/2001 |
| JP | 2001-330465 | 11/2001 |

OTHER PUBLICATIONS

Pere-Pau Vazquez, et al., "Viewpoint Selection Using Viewpoint Entropy", Vision, Modeling, and Visualization 2001, Nov. 21-23, 2001, 8 pages.

* cited by examiner

*Primary Examiner*—Tan Q. Nguyen
(74) *Attorney, Agent, or Firm*—Oblon, Spivak, McClelland, Maier & Neustadt, P.C.

(57) ABSTRACT

A guidance information providing apparatus comprises a first memory to store network data including line segment data representing a passage in a target area of route guidance in an information map and point data representing a connecting point of a passage, a second memory store three-dimensional shape data representing a three-dimensional shape of the target area, a route search unit which searches for a guiding route connecting an input departure place and destination, a setting unit which sets viewpoint position candidates, an evaluation unit which obtains an evaluation value, from each viewpoint position candidate, an generating unit which determines a viewpoint position, on the basis of the evaluation value of visibility from each viewpoint position candidate, and generates the information map by projecting the three-dimensional shape data, and a presentation unit which presents the generated information map to a user.

36 Claims, 20 Drawing Sheets

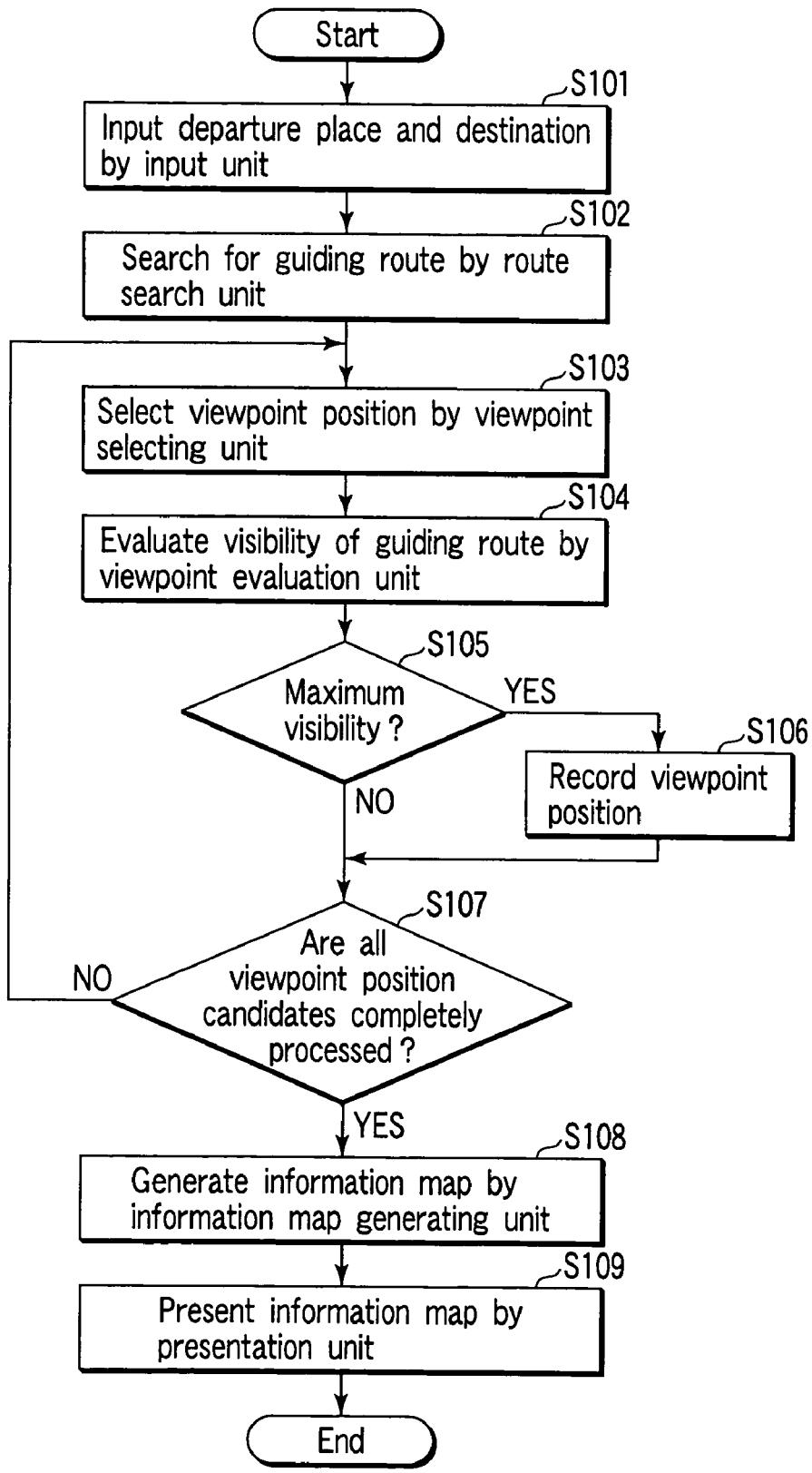
F I G. 2

FIG. 3A

Departure place:
[ Search ]

Destination:
[ Search ]

[Display]   [Reset]

FIG. 3B

Departure place:
[ S station, T line ]   [ Search ]

Destination:
[ Search ]

[Display]   [Reset]

FIG. 3C

Search results (S station, T line):

T line, South gate
Platform 1 (bound for A)
[Platform 2 (bound for A)]
Platform 3 (bound for A)
Platform 4 (bound for A)
T line, Ticket office
T line, Commutation ticket office

FIG. 3D

Departure place:
Platform 2 (bound for A)
[ S station, T line ]   [ Search ]

Destination:
[ S station, Y line ]   [ Search ]

[Display]   [Reset]

FIG. 3E

Search results (S station, Y line):

Y line, Central gate
Y line, South gate
Y line, North gate
[Y line, Outer tracks,
   Platform 1 (bound for B)]
Y line, Inner tracks,
   Platform 2 (bound for C)
Y line, Ticket office

FIG. 3F

Departure place:
Platform 2 (bound for A)
[ S station, T line ]   [ Search ]

Destination:
Y line, Outer tracks,
   Platform 1 (bound for B)
[ S station, Y line ]   [ Search ]

[Display]   [Reset]

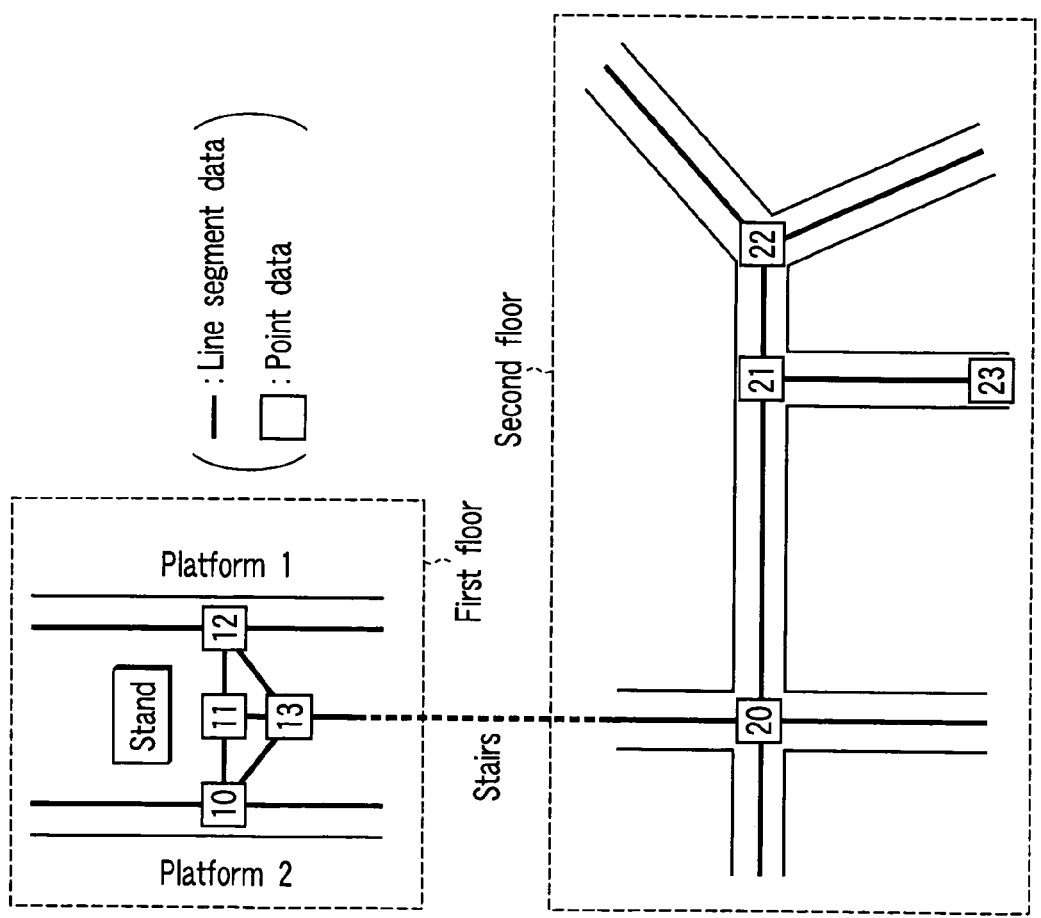

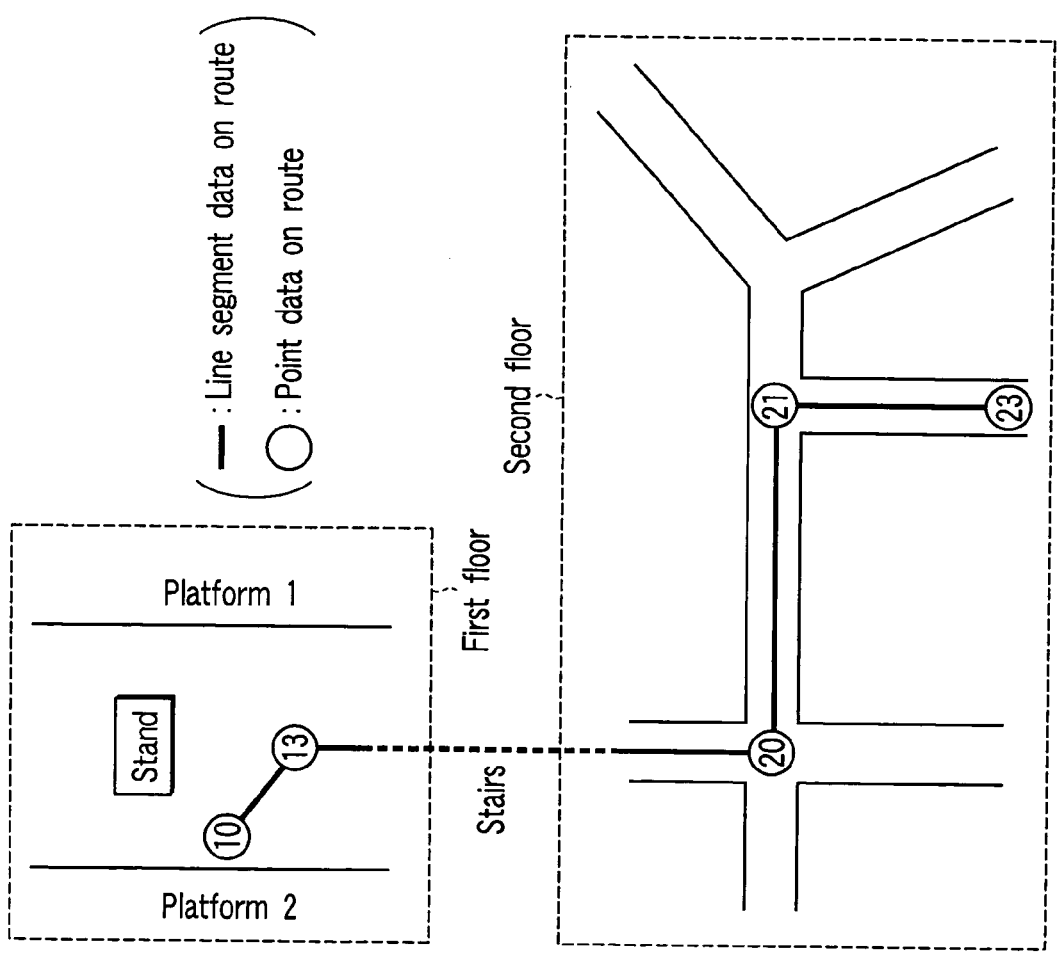

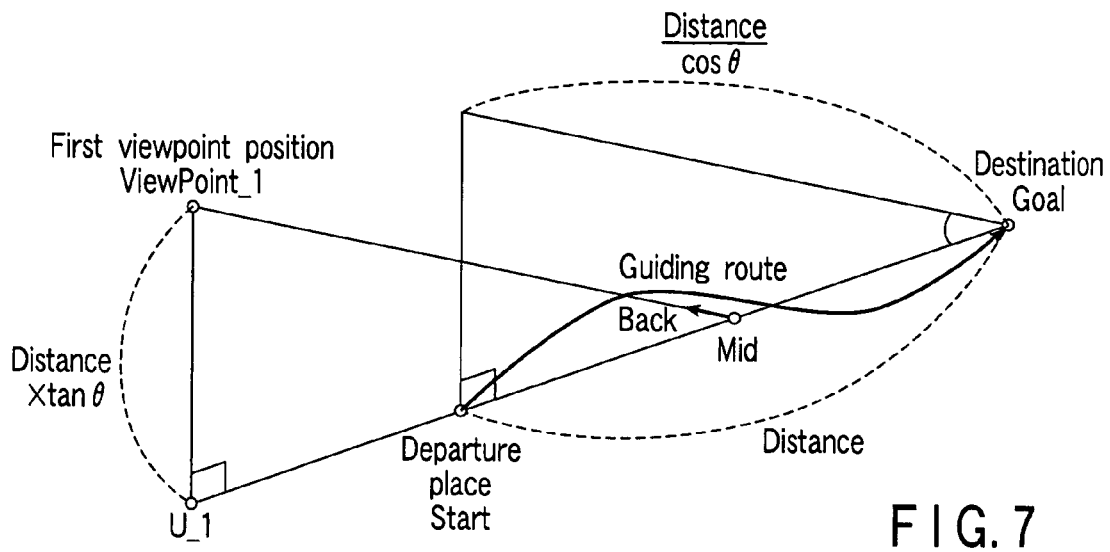
FIG. 7
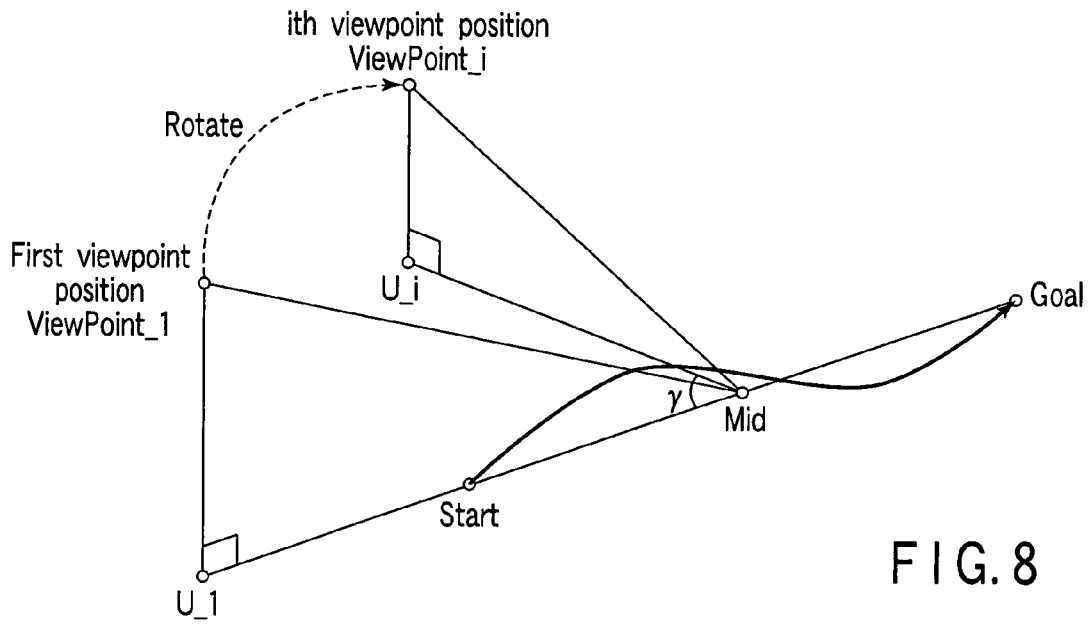
FIG. 8
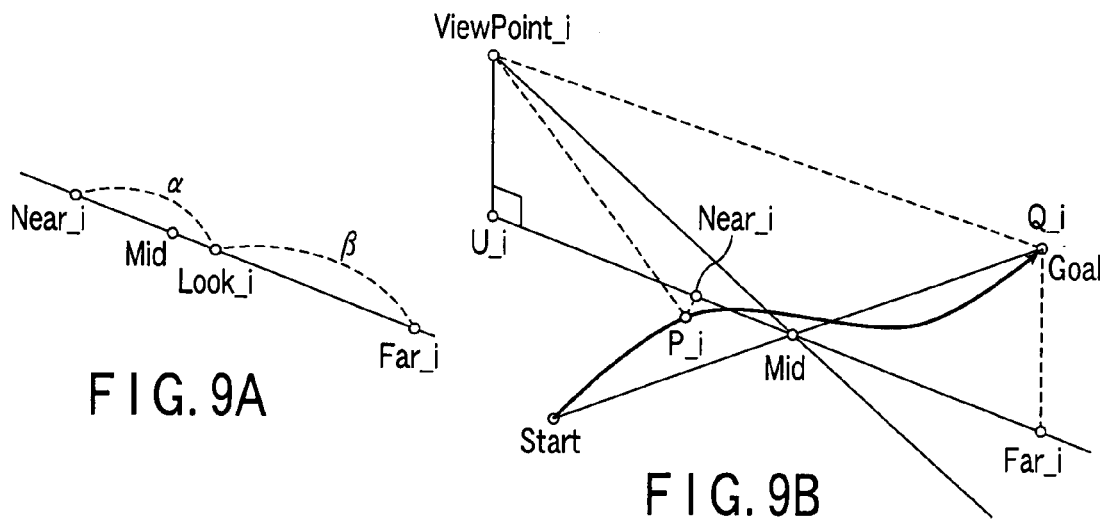
FIG. 9A
FIG. 9B

| Point ID | Three-dimensional coordinates |
|---|---|
| 0 | (-7.5,6.0,0.0) |
| 1 | (-4.5,5.7,0.0) |
| 2 | (-1.5,5.2,0.0) |
| 3 | (0.2,4.5,0.0) |
| 4 | (-9.2,5.2,0.0) |
| 5 | (-6.5,4.2,0.0) |
| 6 | (-4.5,2.5,0.0) |
| 7 | (-0.7,1.7,0.0) |
| 8 | (-10.2,3.5,0.0) |
| 9 | (-7.7,2.7,0.0) |
| 10 | (-10.2,1.2,0.0) |
| 11 | (-5.7,0.2,0.0) |
| 12 | (-3.0,-0.2,0.0) |
| 13 | (-8.2,-1.2,0.0) |
| 14 | (-5.8,-1.5,0.0) |

| Triangle ID | Line segment ID | Line segment ID | Line segment ID |
|---|---|---|---|
| 0 | 1 | 14 | 16 |
| 1 | 2 | 17 | 3 |
| 2 | 5 | 19 | 22 |
| 3 | 6 | 23 | 7 |
| 4 | 9 | 25 | 29 |
| 5 | 10 | 30 | 11 |
| 6 | 15 | 34 | 18 |
| 7 | 35 | 37 | 20 |
| 8 | 21 | 38 | 24 |
| 9 | 41 | 46 | 26 |
| 10 | 27 | 49 | 52 |
| 11 | 28 | 53 | 31 |
| 12 | 36 | 43 | 39 |
| 13 | 40 | 44 | 47 |
| 14 | 45 | 57 | 48 |
| 15 | 50 | 58 | 59 |
| 16 | 51 | 60 | 54 |

| Line segment ID | Start point ID | End point ID |
|---|---|---|
| 0 | 0 | 1 |
| 1 | 0 | 4 |
| 2 | 0 | 5 |
| 3 | 1 | 0 |
| 4 | 1 | 2 |
| 5 | 1 | 5 |
| 6 | 1 | 6 |
| 7 | 2 | 1 |
| 8 | 2 | 3 |
| 9 | 2 | 6 |
| 10 | 2 | 7 |
| 11 | 3 | 2 |
| 12 | 3 | 7 |
| 13 | 4 | 0 |
| 14 | 4 | 5 |
| 15 | 4 | 8 |
| 16 | 5 | 0 |
| 17 | 5 | 1 |
| 18 | 5 | 4 |
| 19 | 5 | 6 |
| 20 | 5 | 8 |
| 21 | 5 | 9 |
| 22 | 6 | 1 |
| 23 | 6 | 2 |
| 24 | 6 | 5 |
| 25 | 6 | 7 |
| 26 | 6 | 9 |
| 27 | 6 | 11 |
| 28 | 6 | 12 |
| 29 | 7 | 2 |
| 30 | 7 | 3 |
| 31 | 7 | 6 |
| 32 | 7 | 12 |
| 33 | 8 | 4 |
| 34 | 8 | 5 |
| 35 | 8 | 9 |
| 36 | 8 | 10 |
| 37 | 9 | 5 |
| 38 | 9 | 6 |
| 39 | 9 | 8 |
| 40 | 9 | 10 |
| 41 | 9 | 11 |
| 42 | 10 | 8 |
| 43 | 10 | 9 |
| 44 | 10 | 11 |
| 45 | 10 | 13 |
| 46 | 11 | 6 |
| 47 | 11 | 9 |
| 48 | 11 | 10 |
| 49 | 11 | 12 |
| 50 | 11 | 13 |
| 51 | 11 | 14 |
| 52 | 12 | 6 |
| 53 | 12 | 7 |
| 54 | 12 | 11 |
| 55 | 12 | 14 |
| 56 | 13 | 10 |
| 57 | 13 | 11 |
| 58 | 13 | 14 |
| 59 | 14 | 11 |
| 60 | 14 | 12 |
| 61 | 14 | 13 |

FIG. 11

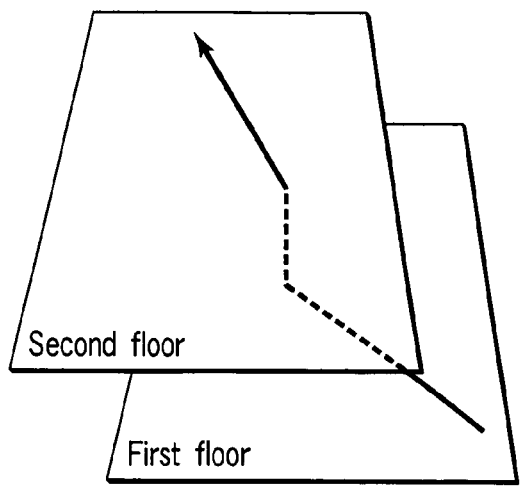
F I G. 32A
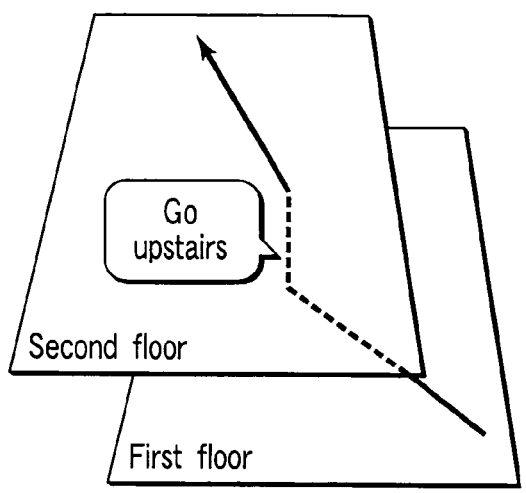
F I G. 32B
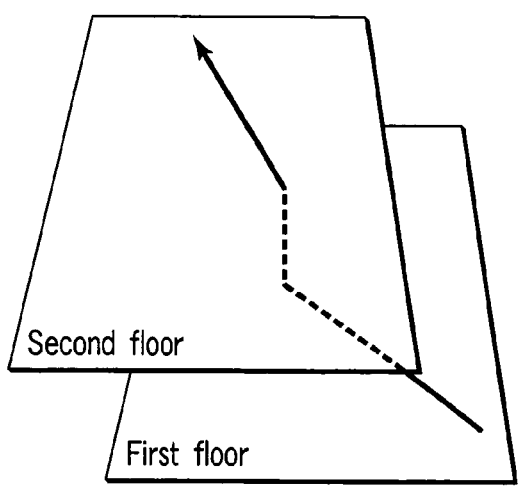
F I G. 33A
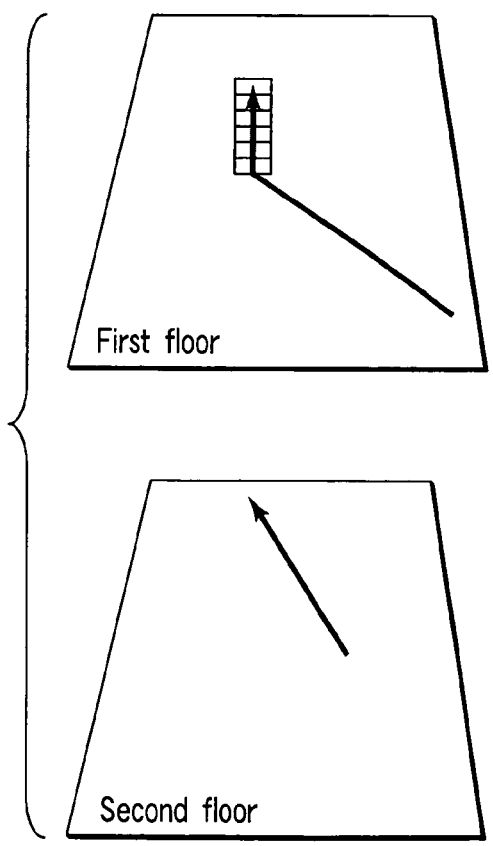
F I G. 33B

GUIDANCE INFORMATION PROVIDING APPARATUS, SERVER APPARATUS, GUIDANCE INFORMATION PROVIDING METHOD, AND PROGRAM PRODUCT

CROSS-REFERENCE TO RELATED APPLICATIONS

This application is based upon and claims the benefit of priority from the prior Japanese Patent Applications No. 2002-378447, filed Dec. 26, 2002; and No. 2003-423977, filed Dec. 22, 2003, the entire contents of both of which are incorporated herein by reference.

BACKGROUND OF THE INVENTION

1. Field of the Invention

The present invention relates to a guidance information providing apparatus, server apparatus, guidance information providing method, and program for providing guidance information.

2. Description of the Related Art

Recently, a guiding apparatus for guiding a user from a departure place to a destination is beginning to be generally used. Although the most typical example is a car navigation system, a guiding apparatus for a walker is also implemented in some forms.

For example, a guidance service based on user's position information is performed for a portable terminal containing a GPS (Global Positioning System) receiver. Also, a service with which a user can see an information map by explicitly designating a departure place and destination without using any position information as described above is provided by PC software or across the Internet. In these services, a guiding route is automatically generated by searching road network data purchased from a map company.

Unfortunately, network data is unprepared for buildings such as stations and underground malls, so no such guidance services as performed for roads outside such buildings are often performed. A service which presents cars and doors which stop near stairs to a user's portable terminal is performed in some stations. However, this service shows only a limited range by a prepared sentence and hence is unsatisfactory to guide a user over a broad range such as a large station or underground mall having a number of floors.

In addition, photographs showing surface views are posted at some ticket gates of subways. Also, a system which guides a user by pasting or interpolating a plurality of photographs of views of precincts is also developed. However, photographs are temporizing information, so it is difficult for a user to understand the whole image of precincts or a route to the destination.

On the other hand, the web site of a railroad corporation presents a three-dimensional information map of the station precincts drawn by an illustrator. This information map is subjected to three-dimensional deformation processes of, e.g., shifting upper and lower floors and omitting ceilings. Therefore, a user can understand portions which may be hidden in a simple information map. However, this information map drawn by an illustrator is merely a single picture, so a viewpoint position cannot be changed in accordance with a departure place and destination designated by a user.

To solve this problem, it is necessary to accumulate data representing the three dimensional shapes of the precincts of a building in a computer, and dynamically generate an information map in accordance with a departure place and destination designated by a user. However, if the shapes of the precincts are simply three-dimensionally presented, a guiding route is often hidden by obstacles or upper floors. To present a readily understandable information map, therefore, a computer must perform deformation processes similar to those performed by an illustrator.

Many such three-dimensional deformation techniques are described in the conventional patent (Jpn. Pat. Appln. KOKAI Publication No. 2001-273526) of a car navigation system. Examples are a method of extracting an obstacle covering a guiding route and omitting this obstacle or presenting it as a semitransparent object, a method of changing the color or texture of an obstacle, a method of presenting only the contour of an obstacle by using dotted lines, a method of changing the size or height of an obstacle, a method of presenting an obstacle by switching it to an icon or character string, a method of presenting an obstacle by flickering it, and a method of forcedly presenting an obstacle at the back of a route. However, different from roads as objects of car navigation systems, many "layers" are present in the precincts of a building. This makes it difficult to add effective deformation processes only by using the conventional techniques.

Also, the sky over the present location is used as a viewpoint in many car navigation systems. In guidance of the precincts of a building, however, a readily understandable information map can be obtained when a viewpoint from which a user can easily understand ups and downs such as stairs and escalators is selected. Also, when a viewpoint from which a guiding route is not so often obstructed by upper floors is chosen, the amount of deformation processes reduces, so an information map close to an actual view can be obtained. For example, a viewpoint from which the whole three-dimensional shape is clearly seen can be determined in the technique disclosed in P. Vazquez, M. Feixas, M. Sbert, and W. Heidrich, "Viewpoint Selection using Viewpoint Entropy", VISION, MODELING, AND VISUALIZATION 2001, Stuttgart, Germany, Nov. 21–23, 2001.

Unfortunately, it is difficult for the above-mentioned technique to determine a viewpoint from which ups and downs of a guiding route are readily understandable, or a viewpoint from which a guiding route is not obstructed by upper floors.

BRIEF SUMMARY OF THE INVENTION

The present invention has been made in consideration of the above situation, and has as its object to provide a guidance information providing apparatus, server apparatus, guidance information providing method, and program product capable of more effectively providing information concerning a guiding route.

The present invention may provide a guidance information providing apparatus which comprises: a first memory which stores network data including line segment data representing a passage in a target area of route guidance in an information map and point data representing a connecting point of the passage; a second memory which stores three-dimensional shape data representing a three-dimensional shape of the target area; an input unit which inputs a departure place and destination; a guiding route search unit which searches the first memory to acquire a guiding route connecting the input departure place and destination, on the basis of the network data; a viewpoint setting unit which sets a plurality of viewpoint position candidates for visualizing the guiding route in the target area expressed in the three-dimensional shape data; an evaluation unit which obtains an evaluation value of visibility, from each of the viewpoint position candidates, of the guiding route in the target area expressed in the three-dimensional shape data; an information map generating unit which generates the information map by determining a viewpoint position for generating the information map from the plurality of viewpoint position candidates on the basis of the evaluation value of visibility and by projecting the three-dimensional shape data from the determined viewpoint position; and a presentation unit configured to present the generated information map to a user.

BRIEF DESCRIPTION OF THE SEVERAL VIEWS OF THE DRAWING

FIG. 2 is a flow chart showing an example of the flow of processing in the first embodiment;

FIGS. 3A to 3F are views showing examples of images for inputting a departure place and destination in the first embodiment;

FIGS. 4A to 4C are views showing an example of a precinct network in the first embodiment;

FIGS. 5A to 5C are views showing an example of a guiding route in the first embodiment;

FIG. 7 is a view showing an example of a first viewpoint position in the first embodiment;

FIG. 8 is a view showing an example of an ith viewpoint position in the first embodiment;

FIGS. 9A and 9B are views showing an example of an ith gazing position in the first embodiment;

FIG. 11 is a view showing the example of the triangular mesh structure in the first embodiment;

FIGS. 32A and 32B are an example of a function of adding a supplementary explanation according to the fourth embodiment; and FIGS. 33A and 33B are an example of a function of generating information maps split the start point or end point of a partial route.

DETAILED DESCRIPTION OF THE INVENTION

The first to eighth embodiments of the present invention will be described below with reference to the accompanying drawing.

(First Embodiment)

The first embodiment of the present invention will be described below.

This embodiment will be explained by taking a station as an example of a guidance target area (e.g., precincts such as a station, underground mall, building, event site, amusement park, or zoo, or a predetermined range of a city) as an object of a service for performing route guidance by presenting an information map, and taking an information map of station precincts as an example of the information map.

Figure 1:
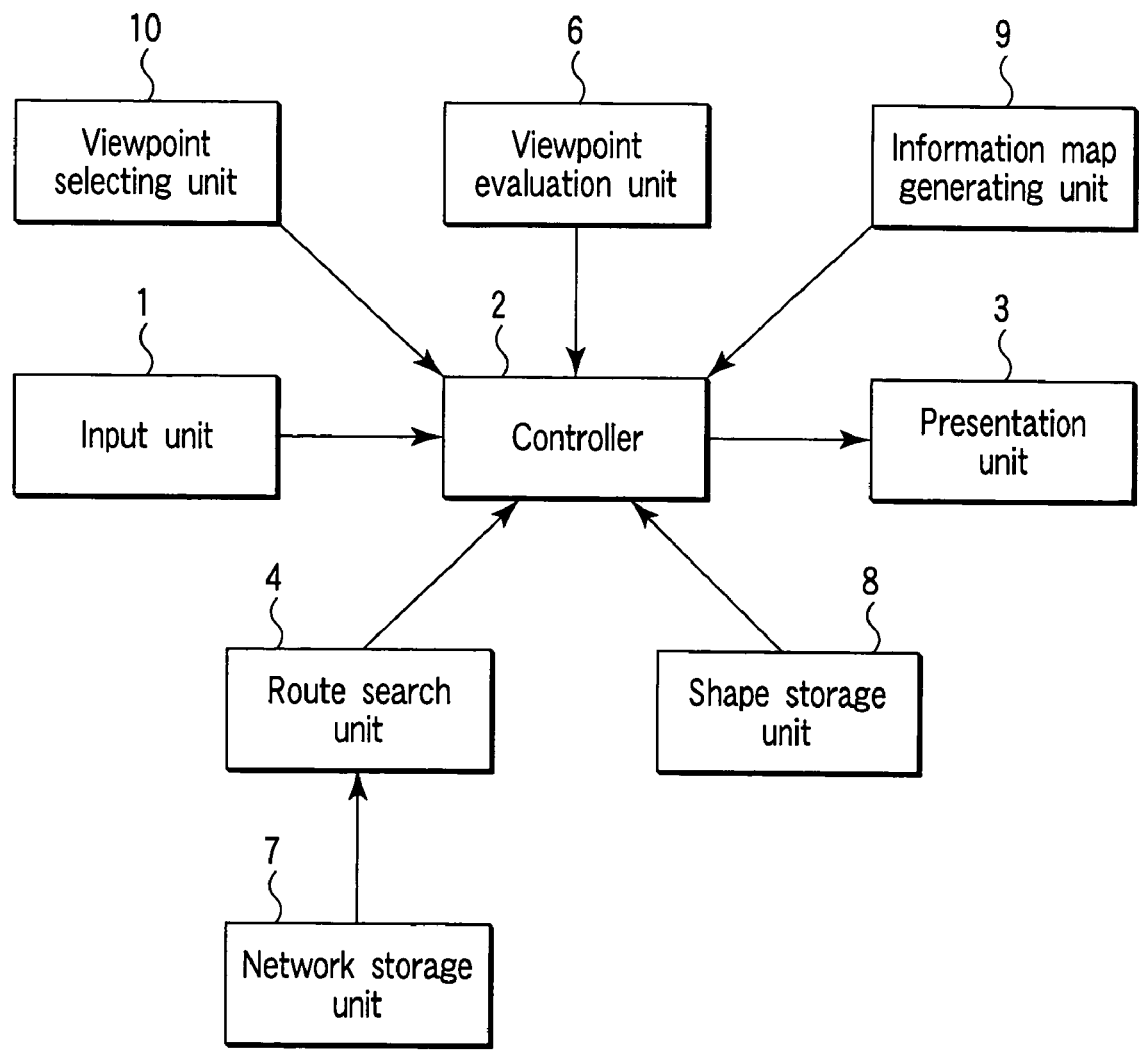
FIG. 1 is a view showing the arrangement of an information map presenting apparatus according to the first embodiment.

FIG. 1 shows the arrangement of an information map presenting apparatus according to this embodiment.

As shown in FIG. 1, the information map presenting apparatus of this embodiment comprises an input unit 1, network storage unit 7, route search unit 4, shape storage unit 8, viewpoint selecting unit 10, information map generating unit 9, presentation unit 3, and controller 2.

The input unit 1 is a device for inputting a departure place and destination as objects of guidance in, e.g., precinct guidance. Although it is explaining inputting the departure place and the destination here, it may be inputting other parameter, such as not only the departure place and the destination but a view angle which saw the destination from the departure place or a map of size. The network storage unit 7 stores network data representing passages in precincts or the like. The route search unit 4 searches the network storage unit 7 for a guiding route connecting a departure place and destination. The shape storage unit 8 stores polygon mesh data representing the three-dimensional shape of a guidance target area as an object of guidance such as precincts. Although it is explaining storing polygon mesh data here, it may be storing a data of other expression methods, such as not only the polygon mesh data but a curved surface. The viewpoint selecting unit 10 selects candidates of viewpoint positions to be set in the three-dimensional space on the basis of the guiding route found by the route search unit 4. A viewpoint evaluation unit 6 evaluates (e.g., quantitatively) the visibility of the guiding route from the viewpoint position selected by the viewpoint selecting unit 10. The information map generating unit 9 generates an information map such as a precinct information map by projecting the three-dimensional shape of, e.g., precincts from the viewpoint position which is evaluated to give the best view of the precincts by the viewpoint evaluation unit 6. The presentation unit 3 presents a user with the three-dimensional information map of the precincts or the like generated by the information map generating unit 9. The controller 2 controls the operation of each unit.

Note that this information map presenting apparatus can be constructed as an apparatus including the whole configuration described above, or as a server-client system in which a server apparatus contains part of the above configuration (and a transmitting/receiving function of communicating requests and information maps across a network), a client apparatus contains the rest of the configuration (and a transmitting/receiving function of communicating requests and information maps across a network), and these client apparatus and server apparatus are connected across a wired or wireless network. In the former case, the information map presenting apparatus may also be constructed as a totally standalone apparatus. Alternatively, the information map presenting apparatus can be so designed as to have a function of connecting to a network and a function of downloading necessary information (e.g., the latest versions of various data). In the latter case, various dispersion methods are possible. For example, the input unit 1 and presentation unit 3 are incorporated into the client apparatus, and the rest is incorporated into the server apparatus. The client apparatus can also be a dedicated terminal. For example, a PC or cell phone terminal can be used. These respects apply to the second to sixth embodiments to be described later.

FIG. 2 shows an example of the processing sequence of the information map presenting apparatus of this embodiment.

In step S101, a user uses the input unit 1 to input a departure place and destination of precinct guidance. Note that the departure place need not be the present position (e.g., a point other than the present position can be set as a departure place, and the present position can be set as a destination). Examples of devices usable as the input unit 1 are a touch pen, a touch panel, a mouse, operation keys such as buttons, a microphone for inputting voices, and a device which communicates with a user's portable terminal.

FIGS. 3A to 3F show an example of a user interface for performing the input process.

In this example, an image as shown in FIG. 3A which includes four input forms, two search buttons, one reset button, and a "Display" button for displaying an information map is displayed as an initial image. When the user designates a keyword related to the departure place (e.g., when the user inputs "S station, T line" and touches the search button as shown in FIG. 3B), a list of keyword-related places in the station precincts is displayed (e.g., a list is displayed as shown in FIG. 3C). Therefore, the user selects one of these places.

In FIG. 3C, seven candidates such as "T line, South gate" are displayed for the designated keyword "S station, T line", and the user selects the present position, i.e., "Platform 2 (bound for A)" as a departure place.

The destination can be input in the same manner as for the departure place. For example, when the user inputs the keyword "S station, T line" and touches the search button as shown in FIG. 3D, a list of keyword-related places in the station precincts is displayed as shown in FIG. 3E. Therefore, the user need only select, e.g., "Y line, Outer tracks, Platform 1 (bound for B)". When the departure place and destination are completely input as shown in FIG. 3F, the user touches the "Display" button in the lower portion of the screen, and the flow advances to next processing.

The user interface for inputting the departure place and destination is, of course, not limited to the example shown in FIGS. 3A to 3F, and various other methods are possible. Examples are an input method using hierarchical menus corresponding to different types of places, e.g., a platform, doorway, gate, ticket office, and rest room, an input method using voices, and an input method which communicates with a user's portable terminal. It is also possible to automatically determine a departure place by receiving position data from a position providing device installed at a branching point in the precincts or at the entrance of a room by using short-range radio communication such as Bluetooth (TM). Alternatively, one or both of a departure place and destination can be automatically determined by interlocking the information map presenting apparatus with the existing train changing service. Furthermore, if the information map presenting apparatus is installed in the station precincts, it is also possible to input only a destination by omitting inputting of a departure place.

As the method of inputting a departure place and destination, it is also possible to display a map image including the whole or part of a range as a departure place or destination, and allow a user to input a desired portion on the map image as a departure place or destination by using, e.g., a mouse or touch panel. The user can also input a number displayed in a predetermined portion on the map image as a departure place or destination. That is, various other methods can be used.

A description will return to the explanation of the flow chart shown in FIG. 2.

In step S102, the route search unit 4 searches the network data stored in the network storage unit 7 for a guiding route connecting the departure place and destination.

In this practical example, the network data is precinct network data. As shown in FIG. 4A, the precinct network includes line segment data representing passages in the precincts, and point data representing connecting points of the line segment data. For example, the point data exists at a branching point of the line segment data, at the position of a landmark, or at the position of a candidate of the departure place or destination of precinct guidance. Note that these line segment data and point data are stored in forms as shown in FIGS. 4B and 4C, respectively, in the network storage unit 7.

The route search unit 4 extracts from this network a portion corresponding to the guiding route connecting the departure place and destination. In this processing, it is possible to use, e.g., a Dijkstra's algorithm known as a method of obtaining a minimum-cost route on a network. Note that the total distance of a route is generally used as the cost of the Dijkstra's algorithm. In addition, the cost may also be changed by adding the number of corners included in the route or the sizes of ups and downs such as stairs and escalators.

For example, a guiding route as shown in FIG. 5A is generated as a result of the application of the Dijkstra's algorithm. FIG. 5A shows an example of a guiding route which starts from point data No. 23 and ends at point data No. 10 via point data Nos. 21, 20, and 13 in this order. This guiding route includes line segment data shown in FIG. 5B and point data shown in FIG. 5C. FIG. 5B shows line segment data on the route extracted from FIG. 4B. FIG. 5C shows point data on the route extracted from FIG. 4C.

A description will return to the explanation of the flow chart shown in FIG. 2.

In step S103, a viewpoint position is selected by the viewpoint selecting unit 10.

This selection will be explained by taking a method of selecting viewpoint positions in turn from previously obtained viewpoint position candidates as an example.

Figure 6:
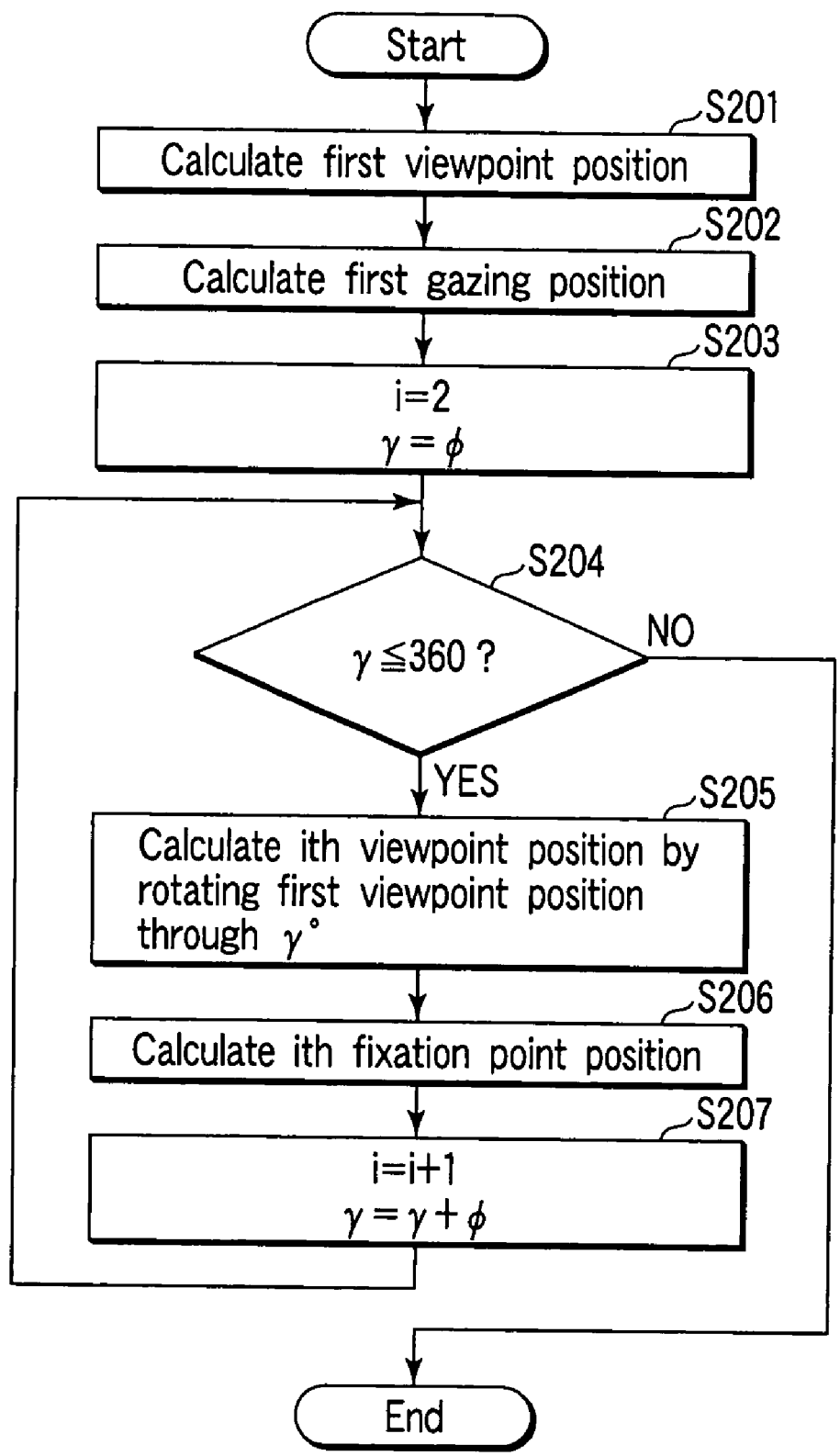
FIG. 6 is a flow chart showing an example of the flow of a process of obtaining viewpoint position candidates in the first embodiment.

FIG. 6 shows an example of a processing sequence of obtaining viewpoint position candidates.

In first step S201, a first viewpoint position ViewPoint_1 is calculated by $$\text{ViewPoint\_1} = \text{Mid} + ((\text{Distance}/\cos\theta \times \text{Back})) \quad (1)$$

where Mid indicates the three-dimensional coordinates of a midpoint of a line segment connecting the departure place and destination, Distance is the length of this line segment connecting the departure place and destination, and Back is a unit vector indicating a backward and upward angle $\theta$ when the destination is viewed from the departure place. As the value of $\theta$, 30° which is often used in a bird's-eye view of a car navigation system can be designated. Alternatively, the value of $\theta$ can be input from the input unit 1 by the user. Note that a point immediately below ViewPoint_1 is represented by U_1. Individual parameters are as shown in FIG. 7.

In step S202, a first gazing position Look_1 is calculated by equation (2) to be presented later. A method of calculating this gazing position will be explained as calculation of an ith gazing point in step S206.

In step S203, a suffix $i$ and rotational angle $\gamma$ are initialized.

In step S204, whether the rotational angle $\gamma$ is 360° or less is determined. If the rotational angle $\gamma$ is 360° or less, the flow advances to step S205. If the rotational angle $\gamma$ is larger than 360°, this process of obtaining viewpoint position candidates is terminated. In this determination in step S204, candidates are determined in accordance with whether the rotational angle $\gamma$ is 360° or less. However, the present invention is not limited to this method. For example, the determination may also be made by using another value as the rotational angle $\gamma$. It is also possible to determine candidates from a three-dimensional range by introducing, e.g., a solid angle or a direction such as a height, in addition to the rotational angle $\gamma$.

In step S205, an ith viewpoint position ViewPoint_i and a point U_i immediately below that are calculated by rotating the first viewpoint position ViewPoint_1 through $\gamma°$ around Mid. FIG. 8 illustrates this processing.

In step S206, a gazing position Look_i corresponding to each viewpoint position ViewPoint_i is calculated by $$\text{Look\_}i = \alpha \times \text{Near\_}i + \beta \times \text{Far\_}I \quad (2)$$

where Near_i is the foot of perpendicular extended from a point P_i on a route closest to ViewPoint_i to a straight line connecting U_i and Mid, and Far_i is the foot of perpendicular extended from a point Q_i on a route farthest from ViewPoint_i to the straight line connecting U_i and Mid. FIG. 9A shows Near_i and Far_i. Also, $\alpha$ and $\beta$ are positive constants which satisfy $\alpha+\beta=1$. As shown in FIG. 9B, Look_i represents a point which internally divides Far_i and Near_i at $\alpha:\beta$.

In step S207, the suffix $i$ is incremented by 1, and the rotational angle $\theta$ is increased by $\phi°$. After that, the flow returns to step S204. In this manner, viewpoint positions and gazing positions when they are rotated 360° step by step at $\phi°$ around the guiding route are calculated.

In step S103 of FIG. 2, an arbitrary one of the viewpoint position and gazing position candidates thus calculated is selected.

In step S104, the viewpoint evaluation unit 6 calculates the visibility of planes (route surfaces) arranged along the guiding route, thereby quantitatively evaluating the visibility of the guiding route.

The route surfaces are arranged by extracting a portion including the guiding route from the three-dimensional shape (in this example, the three-dimensional shape of the precincts) of the guidance target area stored in the shape storage unit 8, and referring to the shape of this portion.

Figures 10A, 10B, 12:
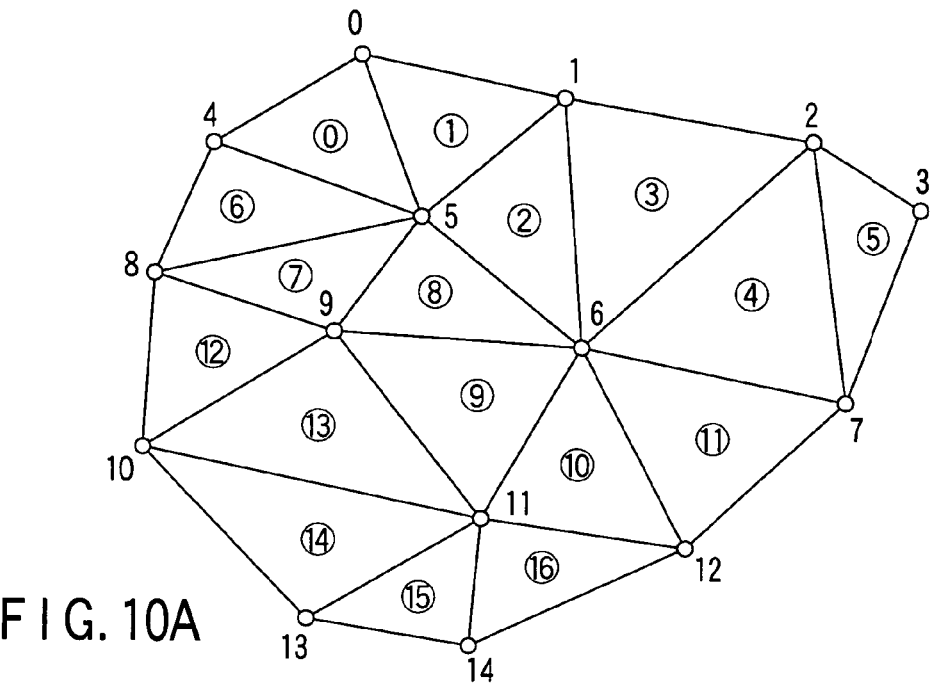
FIGS. 10A and 10B are views showing an example of a triangular mesh structure in the first embodiment.
FIG. 12 is a view showing the example of the triangular mesh structure in the first embodiment.

For example, the three-dimensional shape of the precincts is represented by a triangular mesh structure as shown in FIG. 10A. The triangular mesh structure is a data structure including points each representing three-dimensional coordinates, line segments each connecting two points, and triangles each connecting three line segments counterclockwise. Referring to FIG. 10A, points ID are indicated by usual numbers, and triangles ID are indicated by numbers enclosed with circles. Assume that data of the points, line segments, and triangles are stored in forms as shown in FIGS. 10B, 11, and 12, respectively, in the shape storage unit 8.

Figure 13:
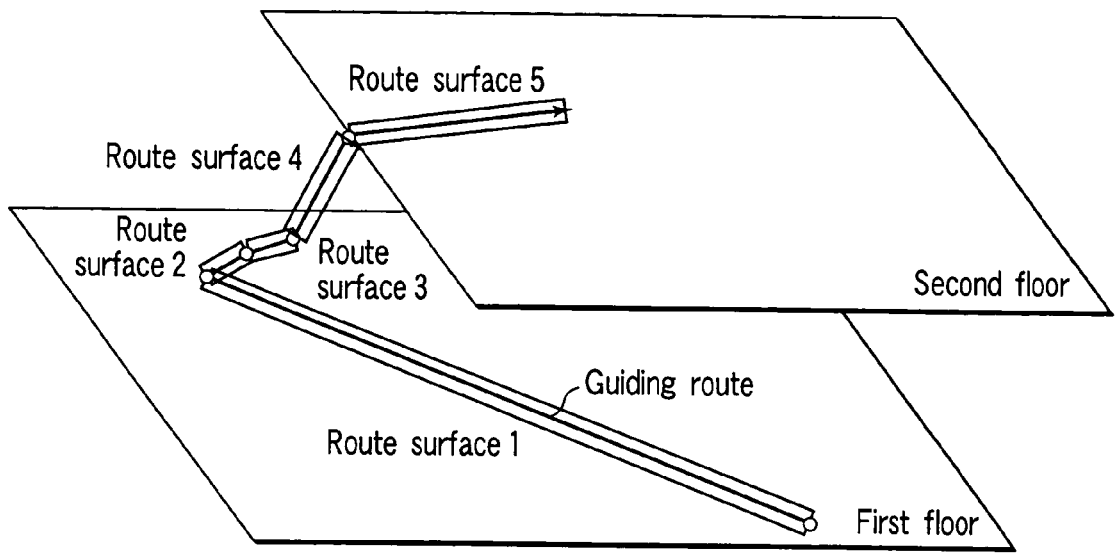
FIG. 13 is a view showing examples of route surfaces in the first embodiment.
Figure 14A:
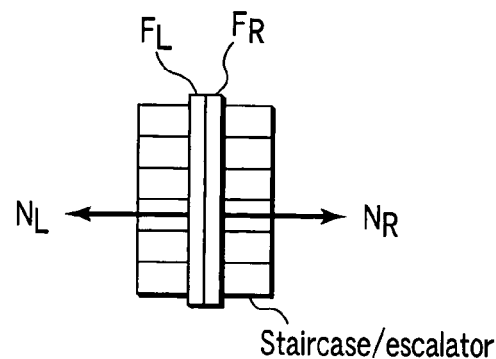
FIGS. 14A and 14B are views showing examples of route surfaces in the first embodiment.
Figure 14B:
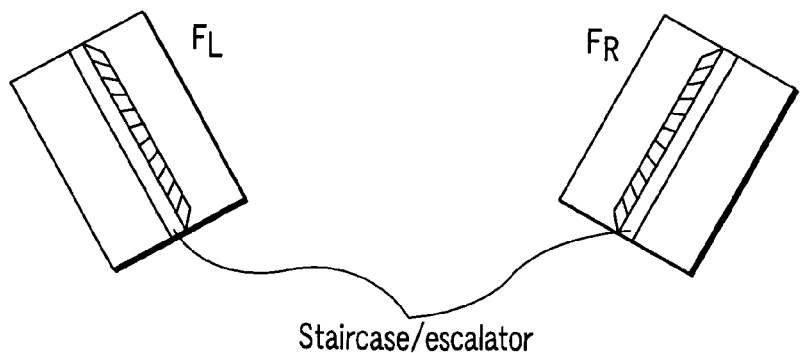

From this triangular mesh, the viewpoint evaluation unit 6 finds triangles crossing line segments forming the guiding route. The viewpoint evaluation unit 6 generates planes having the same normal vectors as those of the found triangles, and arranges these planes with an appropriate width such that the line segments are central lines of these planes. FIG. 13 shows this processing. However, if a triangle positioned below a line segment is a portion of a stairway or escalator, the viewpoint evaluation unit 6 generates two planes having normal vectors NL and NR perpendicular to the normal vector of the triangle. FIGS. 14A and 14B illustrate two route surfaces FL and FR. FIG. 14A shows the front view of the stairway or escalator, and FIG. 14B shows the left and side views of the stairway or escalator. Referring to FIG. 14A, the two route surfaces FL and FR have a thickness for the sake of convenience of display. However, these surfaces need not have any thickness in practice. Assume that after step S102 is completed, the route surfaces are arranged in advance before the loop of steps S103 to S107 begins.

In step S104, as described previously, the visibility of the guiding route is quantitatively evaluated by calculating the visibility of each route surface.

For example, this evaluation uses viewpoint entropy E indicated by $$E = -\Sigma i((\text{Area\_}i/\text{Area\_}t) \times \log 2(\text{Area\_}i/\text{Area\_}t)) \quad (3)$$

where Area_i (i>0) is the projected area of an ith route surface, Area_t is the area of the whole information map, and the suffix $i$ is increased from 0 to the total number of route surfaces. Also, Area_0 is a special value represented by equation (4) below, and is an initial value corresponding to the background area.

$$\text{Area\_0} = \text{Area\_}t - \Sigma i(\text{Area\_}i) \quad (4)$$

In equation (3), the projected area Area_i of the route surface increases as the angle between a line-of-sight vector (a vector from the viewpoint to the gazing point) and the normal vector of the route surface increases. Accordingly, a stairway or escalator included in the guiding route is evaluated to be easiest to see when this portion is viewed from the side. Other portions are evaluated to be easiest to see when they are viewed from above. This strategy is based on the consideration that a two-dimensional line can be understood most easily when it is viewed from above, and a line including ups and downs can be understood most easily when it is viewed from the side. Also, since Area_i increases as the distance between the viewpoint position and route surface decreases, evaluation is made such that the closer a portion to the viewpoint, the more easily the portion is seen. Furthermore, Area_i decreases when the route surface is obstructed by an obstacle or upper floor. Therefore, a viewpoint position from which the line of the whole guiding route can be well seen is evaluated to give higher visibility. As described above, the viewpoint entropy E of equation (3) is an evaluation value well reflecting the reality. Accordingly, it is possible by using this value to accurately determine a viewpoint at which ups and downs of a guiding route can be readily understood, and a viewpoint at which a guiding route is not obstructed by any upper floor.

Note that in equation (3), not only a route connecting floors but also a route surface having an effective landmark in route guidance may also be multiplied by α (α>1).

In step S105, the thus obtained viewpoint entropy E is compared with another one calculated from another viewpoint position candidate. If a maximum viewpoint entropy is obtained at this point, the viewpoint position and gazing position are recorded in step S106.

In step S107, whether the processes in steps S103 to S106 are completely performed for all the viewpoint position candidates is determined. If a viewpoint position candidate remains, the flow returns to step S103 to select a new viewpoint position. If all the viewpoint position candidates are completely processed, the flow advances to step S108.

Figure 15:
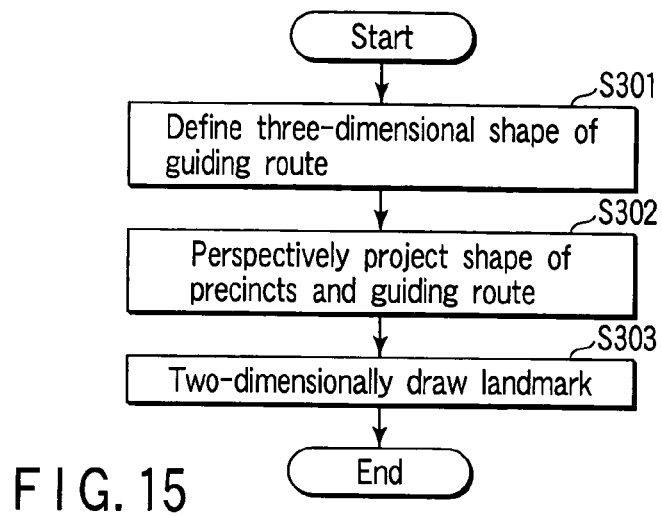
FIG. 15 is a flow chart showing an example of the flow of processing performed by an information map generating unit 9 of the information map presenting apparatus according to the first embodiment.

In the step S108, the information map generating unit 9 generates an information map such as a precinct information map. FIG. 15 shows an example of the processing sequence of generating this precinct information map.

In the first step S301, the three-dimensional shape of the guiding route is defined. For example, this three-dimensional shape can be defined by using line segments, or the route itself may also be three-dimensionally defined by using circular columns or semicircular columns. Alternatively, the whole route can be defined after approximating it with spline curves.

In step S302, the triangular mesh representing the three-dimensional shape of the precincts and the three-dimensional shape of the guiding route defined in step S301 are perspectively projected onto a two-dimensional plane by using the viewpoint and gazing point with which the viewpoint entropy is a maximum, thereby generating a precinct information map. In this information map displayed on the screen, the gazing point is positioned in the center of the information map, and the viewpoint is positioned in a certain portion of the normal passing the center of the information map.

Figure 16A:
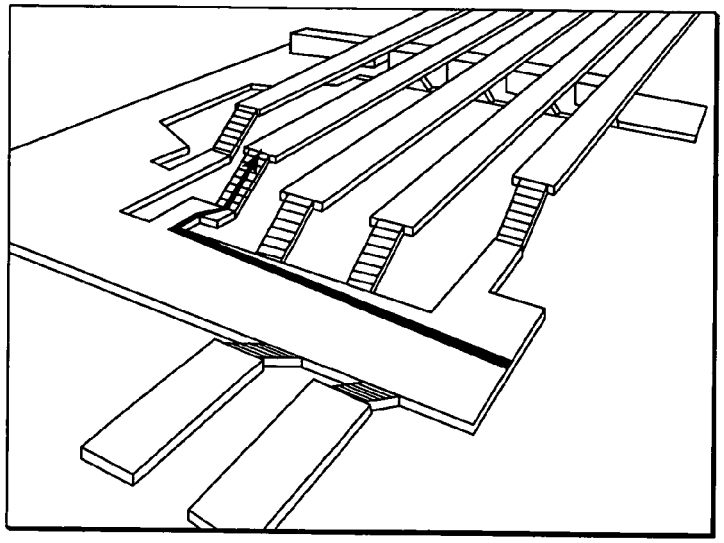
FIGS. 16A and 16B are views showing examples of precinct information maps in the first embodiment.
Figure 16B:
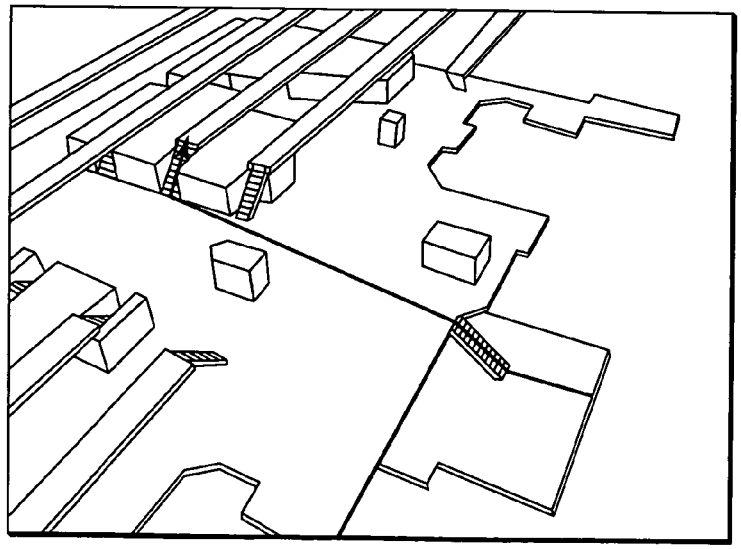

FIGS. 16A and 16B illustrate two examples of precinct information maps. In each of FIGS. 16A and 16B, the start point of an arrow represents the departure place, and the end point of the arrow represents the destination.

In step S303, pieces of information serving as landmarks of guidance, such as platforms, doorways, ticket gates, ticket offices, and rest rooms, are two-dimensionally drawn on the precinct information map generated in step S302.

In step S109 of the flow chart shown in FIG. 2, the presentation unit 3 presents the information map such as a precinct information map.

As the presentation unit 3, it is possible to use various devices such as a display, a printer, a loudspeaker for voice output, and a device which communicates with a user's portable terminal.

In this embodiment as described above, the visibility of each of planes arranged along a guiding route is evaluated. This makes it possible to accurately determine a viewpoint from which ups and downs of the guiding route are readily understandable, or a viewpoint from which the guiding route is not obstructed by any upper floors.

Consequently, an information map which can be understood more easily than conventional maps can be presented in a guidance target area, e.g., the precincts of a building such as a large station or underground mall having a number of floors.

(Second Embodiment)

The second embodiment of the present invention will be described below.

Figure 17:
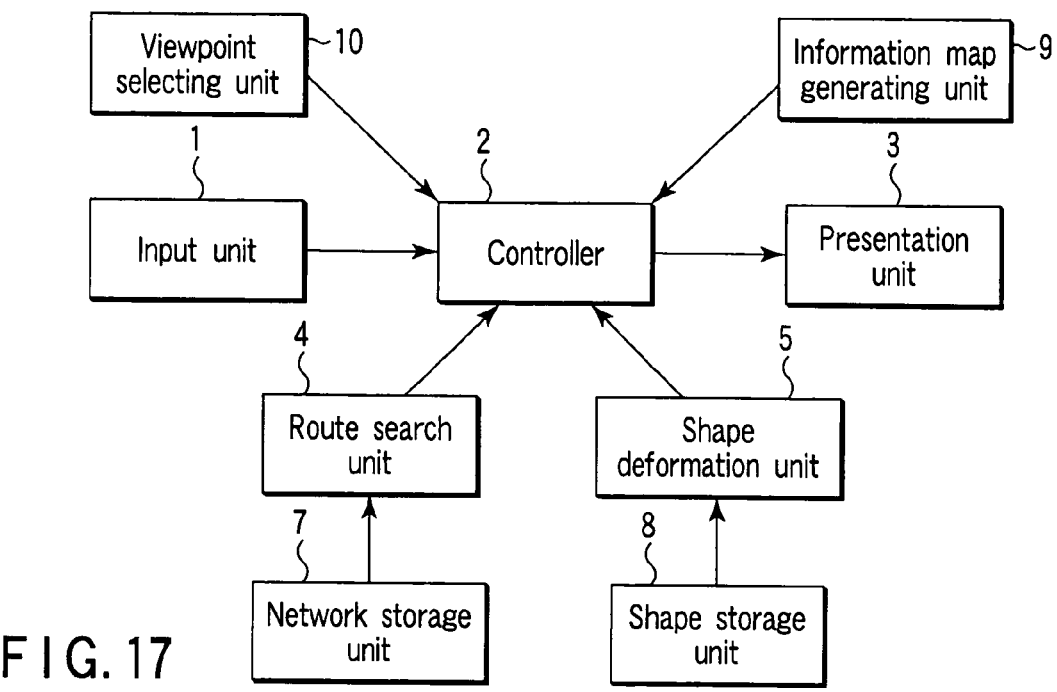
FIG. 17 is a view showing the arrangement of an information map presenting apparatus according to the second embodiment.

FIG. 17 shows the arrangement of an information map presenting apparatus according to this embodiment.

As shown in FIG. 17, the information map presenting apparatus of this embodiment comprises an input unit 1, network storage unit 7, route search unit 4, shape storage unit 8, viewpoint selecting unit 10, shape deformation unit 5, information map generating unit 9, presentation unit 3, and controller 2. The input unit 1 is used to input a departure place and destination as objects of guidance, e.g., precinct guidance. The network storage unit 7 stores network data representing passages in the precincts or the like. The route search unit 4 searches the network storage unit 7 for a guiding route connecting the departure place and destination. The shape storage unit 8 stores polygon mesh data representing the three-dimensional shape of a guidance target area as an object of guidance in the precincts. The viewpoint selecting unit 10 selects a viewpoint position to be set in a three-dimensional model on the basis of the guiding route found by the route search unit 4. The shape deformation unit 5 deforms the three-dimensional shape of the precincts or the like stored in the shape storage unit 8, so that the guiding route is easily seen from the viewpoint position selected by the viewpoint selecting unit 10. The information map generating unit 9 generates an information map such as a precinct information map by perspectively projecting the three-dimensional shape of the precincts or the like deformed by the shape deformation unit 5. The presentation unit 3 presents a user with the three-dimensional information map of the precincts or the like generated by the information map generation unit 9. The controller 2 controls the operation of each unit.

Figure 18:
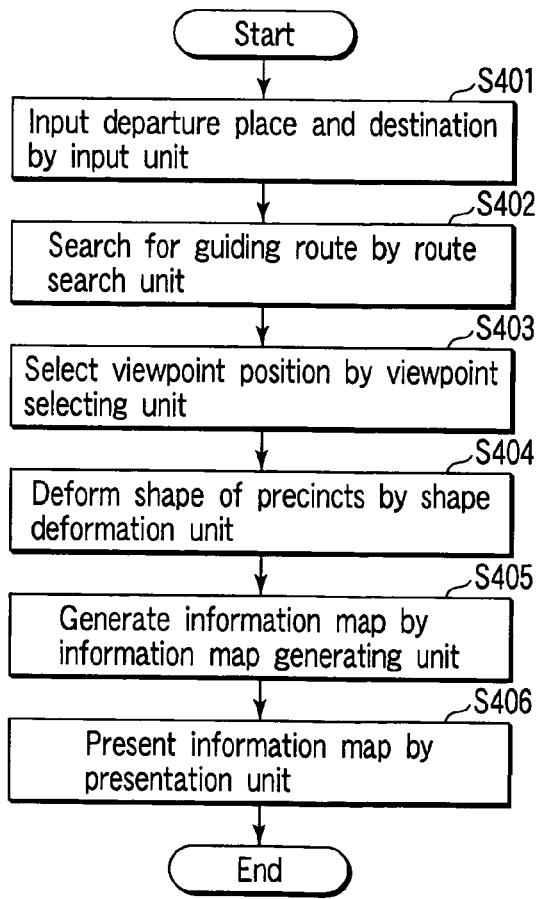
FIG. 18 is a flow chart showing an example of the flow of processing in the second embodiment.

FIG. 18 shows an example of the processing sequence of the information map presenting apparatus of this embodiment.

The contents of processes in steps S401, S402, S405, and S406 are the same as steps S101, S102, S108, and S109, respectively, shown in FIG. 2, so steps S403 and S404 will be explained below.

In step S403, the viewpoint selecting unit 10 selects and sets a viewpoint position and gazing position. In this embodiment, any method can be used in this step. That is, it is possible to use either the same method as or a method different from that of the first embodiment. Examples of the method different from that of the first embodiment are: a method in which a user designates a viewpoint position and gazing position; a method in which a user designates a viewpoint position, and the information map presenting apparatus calculates a gazing position by a predetermined method on the basis of the designated viewpoint position; a method in which the information map presenting apparatus calculates a viewpoint position and gazing position by a predetermined method on the basis of a departure place and destination; a method in which, when the information map presenting apparatus is mobile, a direction in which the screen of the apparatus actually points is detected, and a viewpoint position and gazing position are calculated such that this specific direction in which the screen actually points matches the same specific direction in an information map when the map is displayed on the screen; and a method in which, when the information map presenting apparatus is fixed in a predetermined portion, information of a specific direction in which the screen of the apparatus actually points is held, and a viewpoint position and gazing position are calculated such that this specific direction in which the screen actually points matches the same specific direction in an information map when the map is displayed on the screen.

In step S404, the shape deformation unit 5 deforms the three-dimensional shape of the precincts stored in the shape storage unit 8. FIGS. 19A to 26B illustrate some examples of this deformation process. In each drawing, A shows a three-dimensional shape before the processing, and B shows a three-dimensional shape after the processing.

Figure 19A:
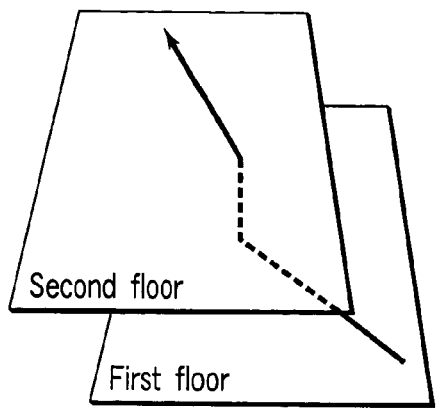
FIGS. 19A and 19B is an example of deformation procedure to delete a portion which obstructs the guiding route.
Figure 19B:
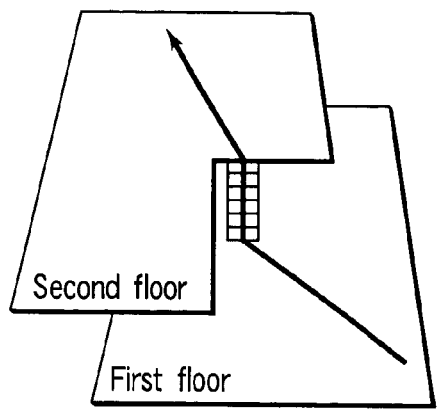

Deformation shown in FIGS. 19A and 19B deletes a portion which obstructs a guiding route from the three-dimensional shape of precincts. In FIG. 19A, a guiding route is made up of three portions, i.e., the first floor, a staircase, and the second floor, but a portion of the first floor and the staircase are obstructed by the second floor. This makes it difficult for a user to understand the line of this guiding route. Therefore, as shown in FIG. 19B, a portion which obstructs the guiding route is deleted so that the line of the guiding route can be seen.

Figure 20A:
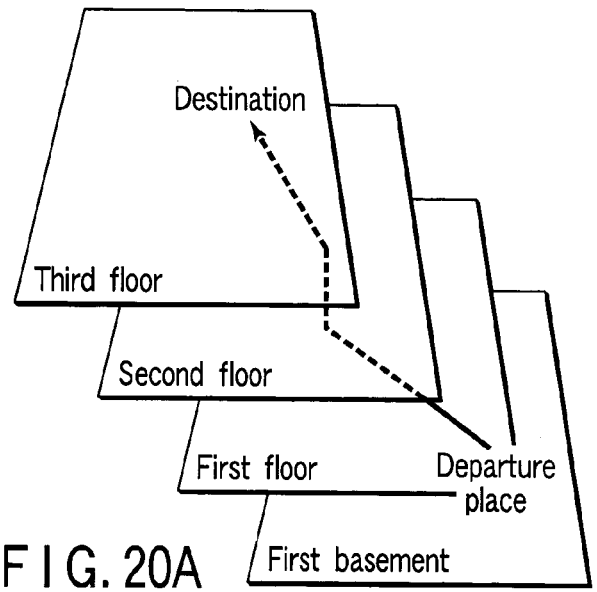
FIGS. 20A and 20B are an example of deformation procedure to delete extra floors from the three-dimensional shape of precincts.
Figure 20B:
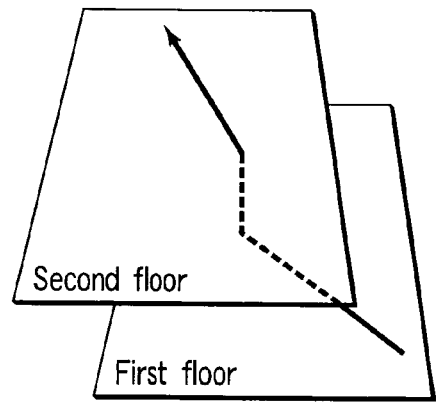

Deformation shown in FIGS. 20A and 20B deletes extra floors from the three-dimensional shape of precincts. In FIG. 20A, the third floor and first basement not including a guiding route are displayed. However, these floors are unsubstantial information for a user. On the contrary, the third floor obstructs a second floor portion of the route and thereby hides substantial information. Therefore, as shown in FIG. 20B, these extra floors not including the guiding route are deleted to eliminate the complexity of display and allow the line of the guiding route to be clearly seen.

Figure 21A:
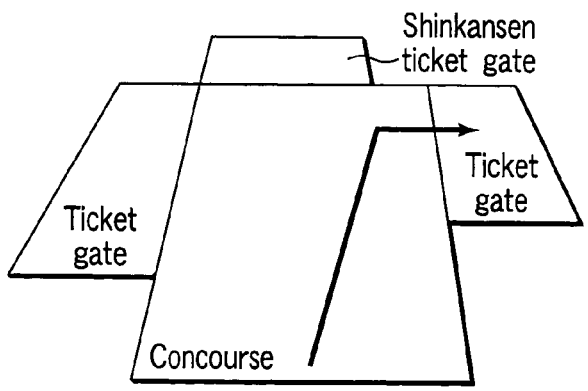
FIGS. 21A and 21B are an example of deformation procedure to delete extra region from the three-dimensional shape of precincts.
Figure 21B:
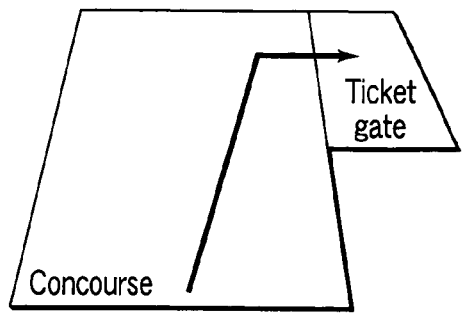

Deformation shown in FIGS. 21A and 21B deletes extra regions from the three-dimensional shape of precincts. In FIG. 21A, two regions not including a guiding route, i.e., a ticket gate on the left side and a Shinkansen ticket gate at the back are displayed. However, these regions are unsubstantial for a user and hide substantial information in some cases. Therefore, as shown in FIG. 21B, these extra regions not including the guiding route are deleted to eliminate the complexity of display and allow the line of the guiding route to be clearly seen.

Figure 22A:
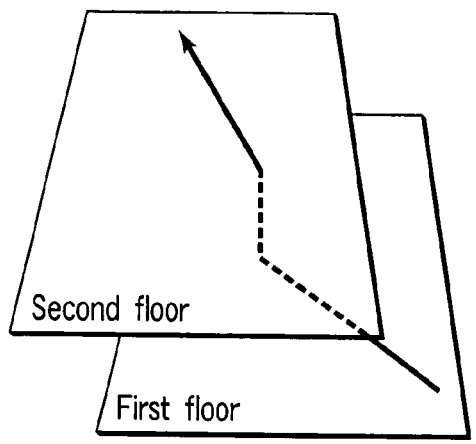
FIGS. 22A and 22B are an example of deformation procedure to move a floor which obstructs a guiding route in the three-dimensional shape of precincts.
Figure 22B:
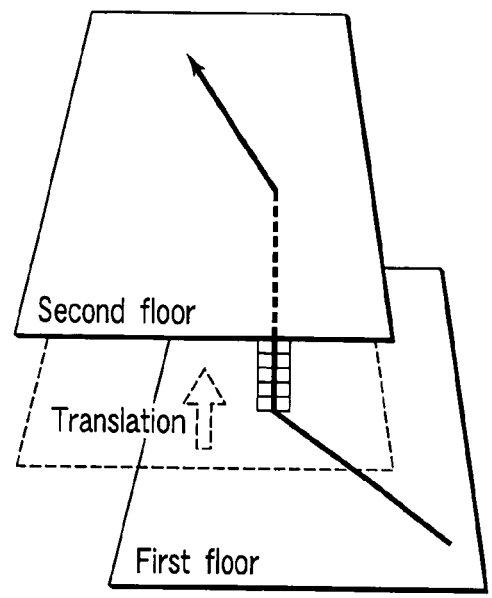

Deformation shown in FIGS. 22A and 22B moves a floor which obstructs a guiding route in the three-dimensional shape of precincts, in an appropriate direction by an appropriate amount. In FIG. 22A, a first floor portion and staircase portion of a guiding route are obstructed by the second floor. This makes it difficult for a user to understand the line of this guiding route. Therefore, as shown in FIG. 22B, this floor obstructing the guiding route is horizontally moved so as to be shifted backward. This allows the whole first floor portion and part of the staircase portion of the route to be clearly seen. Moving a floor backward is of course an example, so a floor can be moved in another direction. Also, a moving direction along which a guiding route is most clearly seen can change in accordance with, e.g., the positional relationship between the three-dimensional shape of a guidance target area and the guiding route. Therefore, it is also possible, without fixing a moving direction, to evaluate a direction in which a guiding route is most clearly seen, and move a floor in an optimum direction.

Figure 23A:
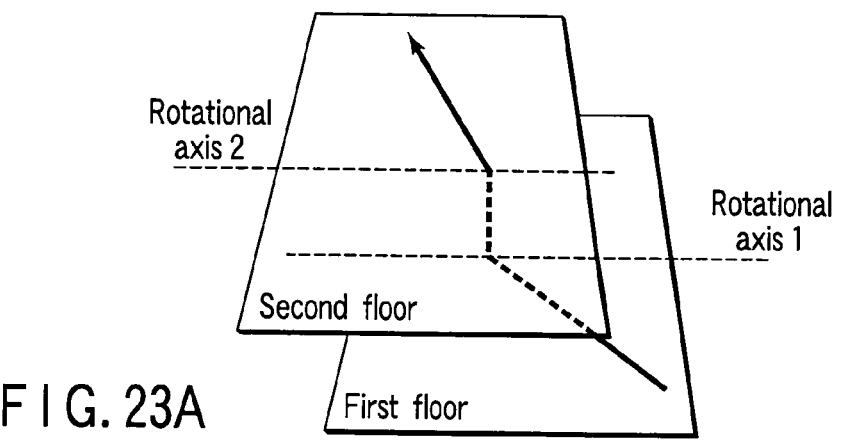
FIGS. 23A and 23B are an example of deformation procedure to rotate a floor which obstructs a guiding route in the three-dimensional shape of precincts.
Figure 23B:
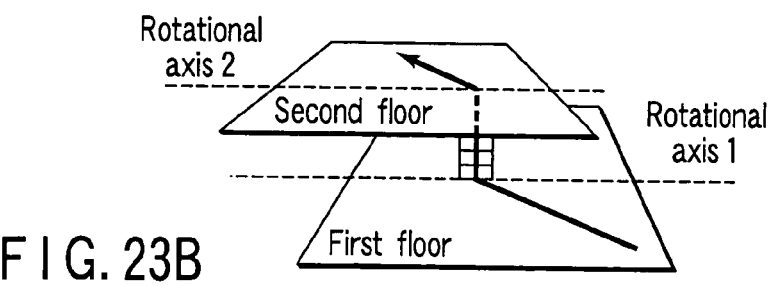

Deformation shown in FIGS. 23A and 23B rotates, at an appropriate angle around an appropriate rotational axis, a floor which obstructs a guiding route and a floor which is obstructed in the three-dimensional shape of precincts. In FIG. 23A, a first floor portion and staircase portion of a guiding route are obstructed by the second floor. This makes it difficult for a user to understand the line of this guiding route. Therefore, as shown in FIG. 23B, the second floor is rotated so as to fall backward around rotational axis 2, and the first floor is rotated so as to fall backward around rotational axis 1. This allows the whole first floor portion and part of the staircase portion of the route to be clearly seen. As the rotational axes, it is possible to use, e.g., vectors which pass by the intersections between the floors and a partial route (in FIGS. 23A and 23B, the staircase portion) connecting the floors, and which are parallel to the floors and perpendicular to the line of sight. The rotational angles of the upper and lower floors need not be the same (one rotational angle can be 0).

Figure 24A:
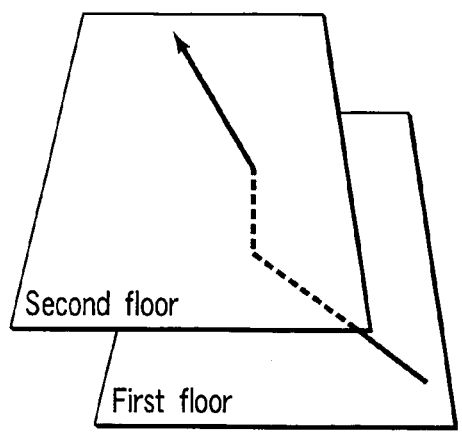
FIGS. 24A and 24B are an example of deformation procedure to curve a floor which obstructs a guiding route in the three-dimensional shape of precincts.
Figure 24B:
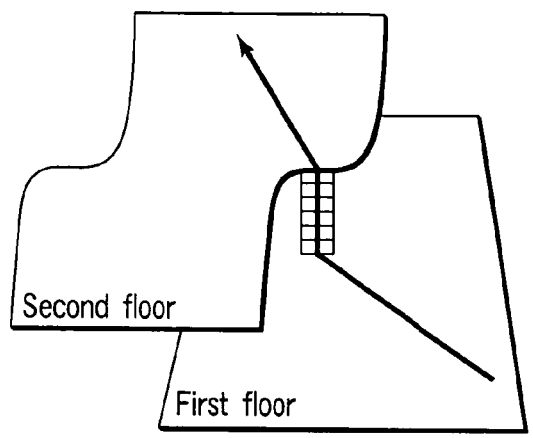

Deformation shown in FIGS. 24A and 24B curves a floor which obstructs a guiding route in the three-dimensional shape of precincts. In FIG. 24A, a first floor portion and staircase portion of a guiding route are obstructed by the second floor. This makes it difficult for a user to understand the line of the guiding route. Therefore, as shown in FIG. 24B, the second floor is curved to allow the line of the guiding route to be clearly seen.

Figure 25A:
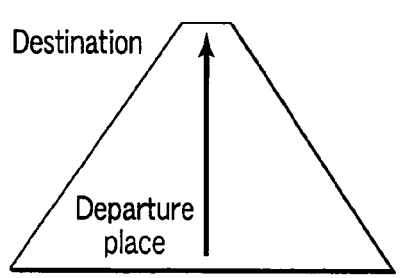
FIGS. 25A and 25B are an example of deformation procedure to rotate a floor including a guiding route far from a viewpoint in the three-dimensional shape of precincts.
Figure 25B:
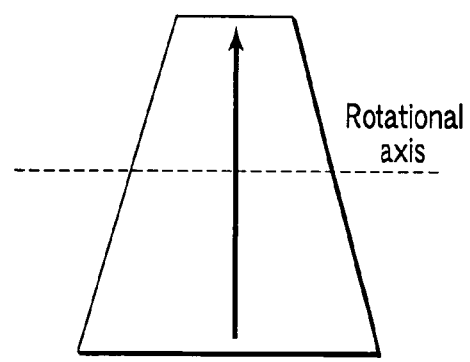

Deformation shown in FIGS. 25A and 25B rotates a floor including a guiding route far from a viewpoint in the three-dimensional shape of precincts. In FIG. 25A, the destination of a guiding route is positioned far from a viewpoint. This makes it difficult for a user to understand the route and landmarks near the destination. Therefore, as shown in FIG. 25B, the floor is rotated so that the portion positioned far from the viewpoint comes close to it. This allows the portion positioned far from the viewpoint to be clearly seen. The rotational axis can be, e.g., a vector which is parallel to the floor and perpendicular to the line of sight.

Figure 26A:
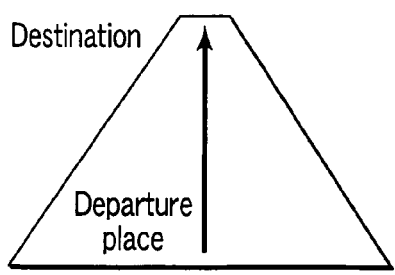
FIGS. 26A and 26B are an example of deformation procedure to curve a floor including a guiding route far from a viewpoint in the three-dimensional shape of precincts.
Figure 26B:
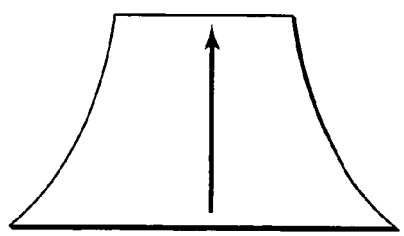

Deformation shown in FIGS. 26A and 26B curves a floor including a guiding route far from a viewpoint in the three-dimensional shape of precincts. In FIG. 26A, the destination of a guiding route is positioned far from a viewpoint. This makes it difficult for a user to understand the route and landmarks near the destination. Therefore, as shown in FIG. 26B, the floor is curved so that the portion positioned far from the viewpoint comes close to it. This allows the portion positioned far from the viewpoint to be clearly seen.

In each of the above examples, it is also possible to use data A in a normal state, and use data B if a user dynamically gives instructions by, e.g., pressing a specific button. In contrast to this, it is further possible to use data B in a normal state, and use data A if a user dynamically gives instructions by, e.g., pressing a specific button. In either case, although in the example shown in FIGS. 19A and 19B only the portion obstructing the guiding route is deleted from the three-dimensional shape of precincts, the floor itself including this portion obstructing the guiding route may also be deleted from the three-dimensional shape of precincts (e.g., it is also possible to display data as shown in FIG. 19A in a normal state, erase the second floor portion if a user dynamically gives instructions by, e.g., pressing a specific button, and again display the second floor portion if the user dynamically gives instructions by, e.g., pressing or releasing the specific button).

Various variations are naturally possible in addition to the examples explained above.

Also, one information map presenting apparatus can include either one deformation process or a plurality of deformation processes. In the latter case, it is possible to selectively use one deformation process, or select two or more combinable deformation processes and simultaneously perform these processes. Alternatively, a deformation process designated beforehand by a user can be selected from the plurality of deformation processes, or these deformation processes can be dynamically switched when a user gives instructions by, e.g., pressing or releasing a specific button. Furthermore, it is possible to use a deformation process selected by the information map presenting apparatus in accordance with predetermined selection standards, or to use a deformation process selected at random by the information map presenting apparatus. In addition, the information map presenting apparatus may execute a plurality of deformation processes and select one deformation process which is evaluated to give the most clear view of a guiding route.

In this embodiment as described above, the three-dimensional shape of precincts so deformed as to allow the line of a guiding route to be clearly seen can be presented.

Consequently, effective deformation can be performed in the precincts of a building such as a large station or underground mall having deep floors or a number of floors. Accordingly, it is possible to present an information map in which the line of a guiding route is clearly seen, and which can be understood more easily than conventional maps.

(Third Embodiment)

The third embodiment of the present invention will be described below. In this embodiment, a plurality of patterns of the deformation processes explained in the second embodiment are executed, an evaluation value of the visibility of each pattern is calculated, and a deformation process having the highest visibility is used.

Figure 27:
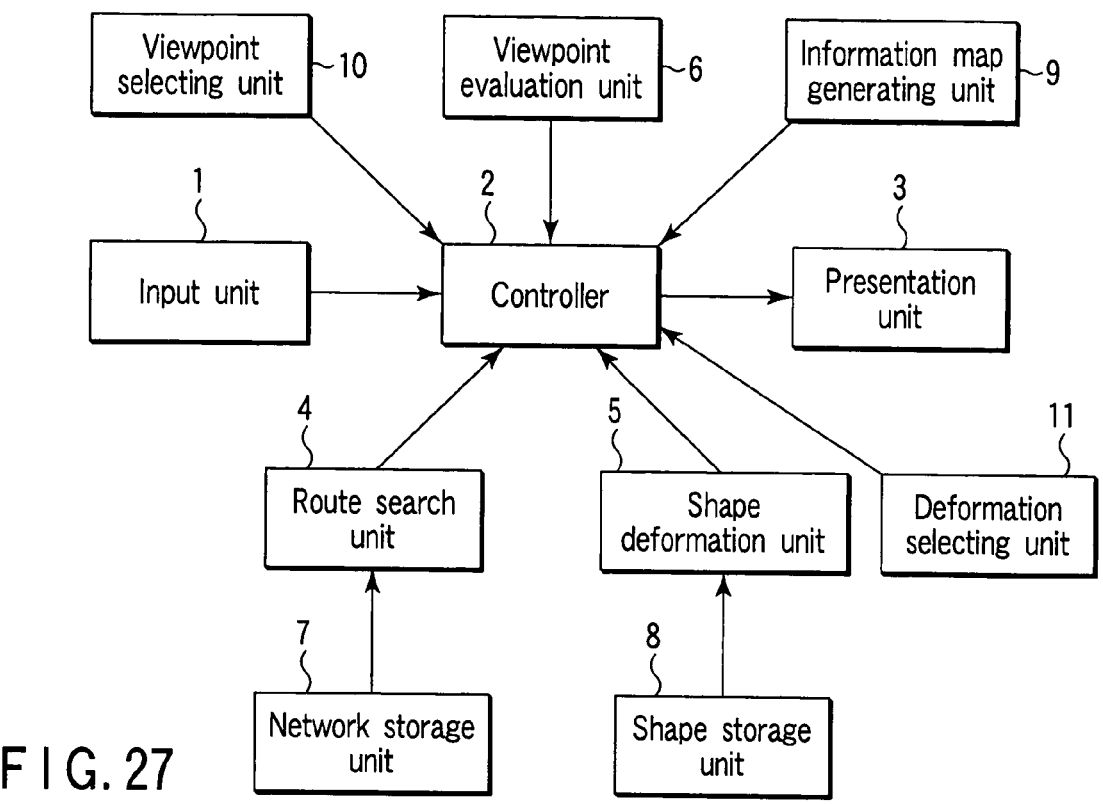
FIG. 27 is a view showing the arrangement of an information map presenting apparatus according to the third embodiment.

FIG. 27 shows the arrangement of an information map presenting apparatus according to this embodiment. As shown in FIG. 27, the information map presenting apparatus of this embodiment is obtained by adding a deformation selecting unit 11 to the arrangement of the second embodiment shown in FIG. 17.

Figure 28:
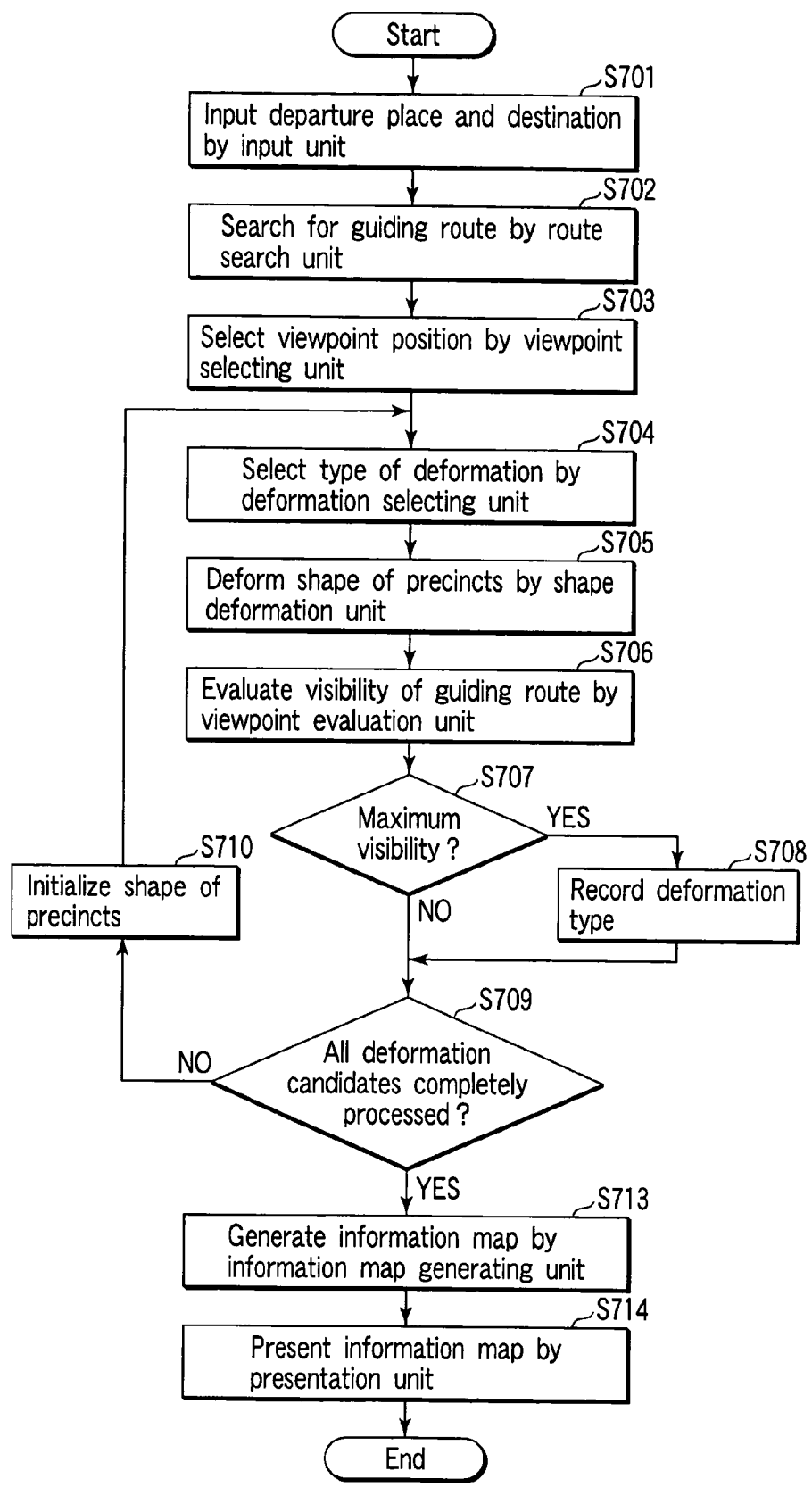
FIG. 28 is a flow chart showing an example of the flow of processing in the third embodiment.

FIG. 28 is a flow chart showing the processing sequence of the information map presenting apparatus of this embodiment. This flow chart is obtained by adding processing pertaining to the deformation selecting unit 11 to the flow chart of the second embodiment shown in FIG. 18. Therefore, the contents of processes in steps S701, S702, S703, S705, S713, and S714 are the same as steps S401, S402, S403, S404, S405, and S406, respectively, shown in FIG. 18. Loop processing related to newly added steps S704 and S706 to S712 will be explained below.

As an initial process of this loop processing, the deformation selecting unit 11 selects types (deformation candidates) of executable deformation processes (step S704). A shape deformation unit 5 deforms the three-dimensional shape of precincts in accordance with the selected deformation types, thereby generating deformed three-dimensional guiding routes (route deformation candidates) (step S705).

A viewpoint evaluation unit 6 quantitatively evaluates the visibility of each obtained route deformation candidate, and calculates an evaluation value concerning each route deformation candidate (step S706). The viewpoint evaluation unit 6 compares each obtained evaluation value with already calculated evaluation values (step S707). If a maximum evaluation value at that point is obtained, a viewpoint position, a gazing point, and the type of deformation are recorded (step S708). If no maximum evaluation value is obtained in step S707, the flow advances to step S709. If there is no already calculated evaluation value in step S707, the present evaluation value is recorded so as to be compared with the next evaluation value.

Subsequently, whether there is another deformation candidate, i.e., whether route deformation candidates are generated for all the deformation processes is checked (step S709). If it is determined that a deformation candidate remains, the precinct shape stored for evaluation is initialized (step S710), and the processes from steps S704 to S708 are executed for this deformation candidate. On the other hand, if it is determined that all the deformation candidates are evaluated, the flow leaves the loop processing.

An information map generating unit 9 then projects, from the viewpoint position selected in step S703, the three-dimensional shape of precincts subjected to the route deformation candidate stored in step S708 and having the highest visibility, thereby generating an information map concerning a guiding route (step S713). A presentation unit 3 presents the generated information map to the user (step S714).

As described above, the precinct information map presenting apparatus of this embodiment quantitatively evaluates a deformation process with which the line of a guiding route is most clearly seen. Accordingly, an optimum deformation process can be automatically and objectively determined. As a consequence, in the precincts of a building such as a large station or underground mall having a number of floors, an information map which can be understood more easily than conventional maps can be generated and presented.

(Fourth Embodiment)

The fourth embodiment of the present invention will be described below.

Figure 29:
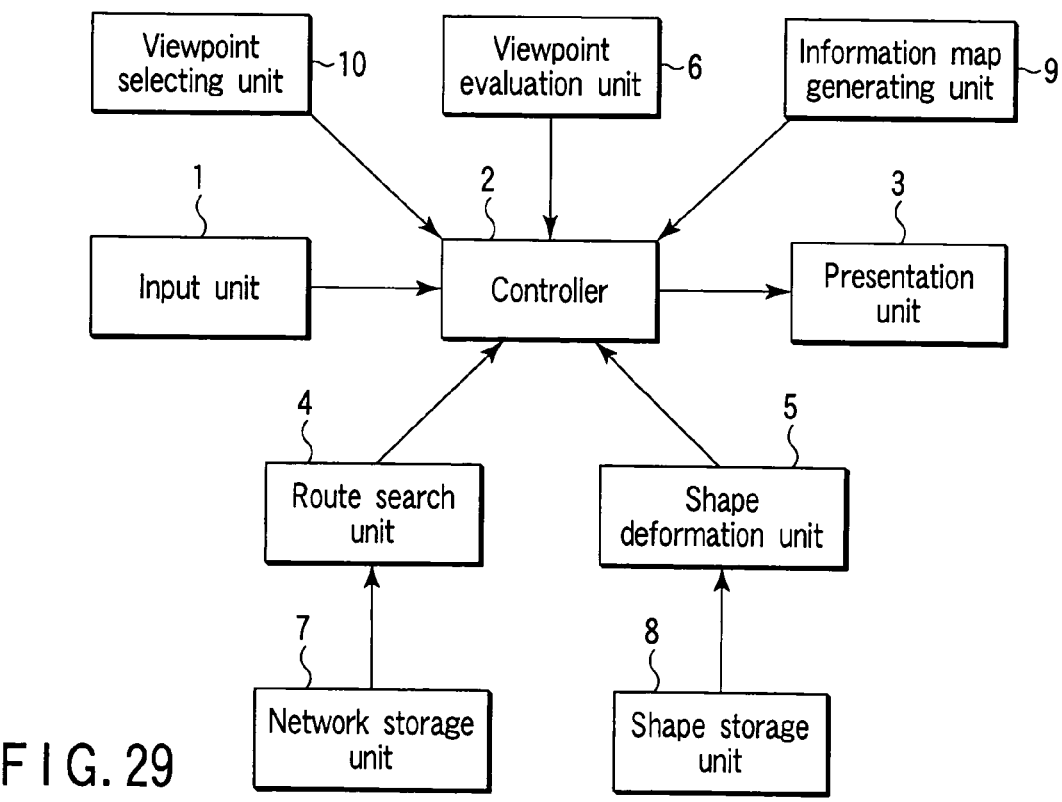
FIG. 29 is a view showing the arrangement of an information map presenting apparatus according to the fourth embodiment.

FIG. 29 shows the arrangement of an information map presenting apparatus according to this embodiment. As shown in FIG. 29, the information map presenting apparatus of this embodiment is obtained by combining the arrangements of the first and second embodiments shown in FIGS. 1 and 17, respectively.

Figure 30:
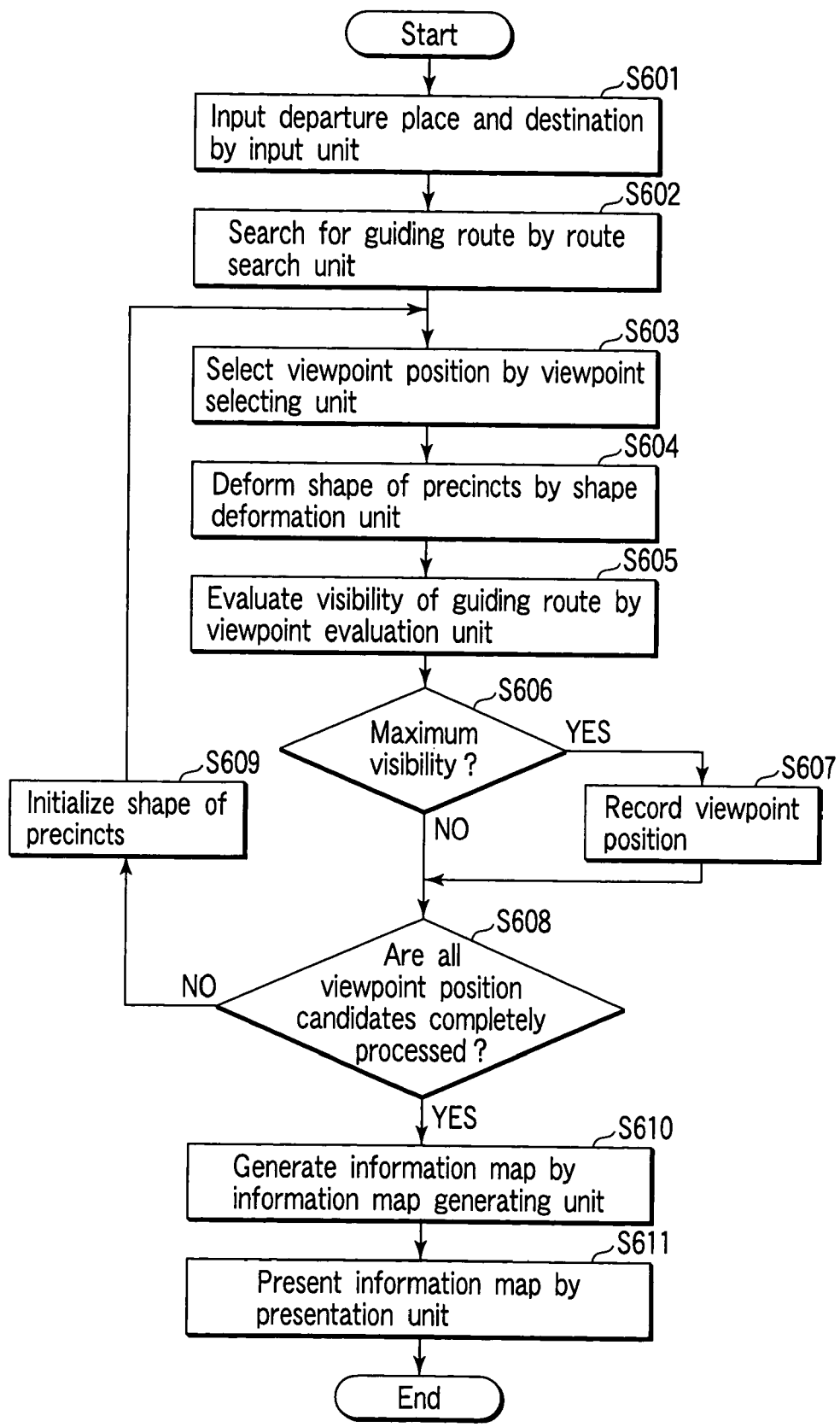
FIG. 30 is a flow chart showing an example of the flow of processing in the fourth embodiment.

FIG. 30 is a flow chart showing the processing sequence of the information map presenting apparatus of this embodiment. FIG. 30 is also the combination of the processing sequences of the first and second embodiments shown in FIGS. 2 and 18, respectively. That is, the contents of processes in steps S601, S602, S603, S605, S606, S607, S608, S610, and S611 are the same as steps S101, S102, S103, S104, S105, and S106, S107, S108, and S109, respectively, shown in FIG. 2. Also, the contents of a process in step S604 is the same as step S404 in FIG. 18. In this embodiment, loop processing in steps S603 to S609 related to newly added step S609 will be explained below.

In first step S603 of this loop processing, a viewpoint selecting unit 10 selects a viewpoint position from viewpoint position candidates.

In step S604, the three-dimensional shape of precincts is deformed so that the line of a guiding route is clearly seen.

In step S605, a viewpoint evaluation unit 6 quantitatively evaluates the visibility of the guiding route. In step S606, the evaluation value is compared with an evaluation value of another viewpoint position candidate. If a maximum evaluation value is obtained at that point, a viewpoint position and gazing position are recorded in step S607.

In step S608, whether the processes in steps S603 to S609 are completely performed for all the viewpoint position candidates is checked. If a viewpoint position remains, the flow advances to step S609 to initialize the three-dimensional shape of the precincts deformed in step S609. After that, the flow returns to step S603 to select a new viewpoint position.

If all the viewpoint position candidates are completely processed, the flow leaves this loop processing.

In this embodiment as described above, it is possible to present the three-dimensional shape of precincts so deformed that the line of a guiding route is clearly seen.

In addition, the visibility of each of planes arranged along the guiding route is quantitatively evaluated. This makes it possible to accurately determine a viewpoint from which ups and downs of the guiding route are readily understandable, or a viewpoint from which the guiding route is not obstructed by any upper floors.

As a consequence, in the precincts of a building such as a large station or underground mall having a number of floors, an information map which can be understood more easily than conventional maps can be presented.

(Fifth Embodiment)

The fifth embodiment of the present invention will be described below. In this embodiment, the deformation process evaluation explained in the third embodiment is executed for a plurality of viewpoint positions, an evaluation value of the visibility of each deformation process at each viewpoint position is calculated, and a viewpoint position and deformation process having the highest visibility are used.

The arrangement of an information map presenting apparatus according to this embodiment is the same as shown in FIG. 27.

Figure 31:
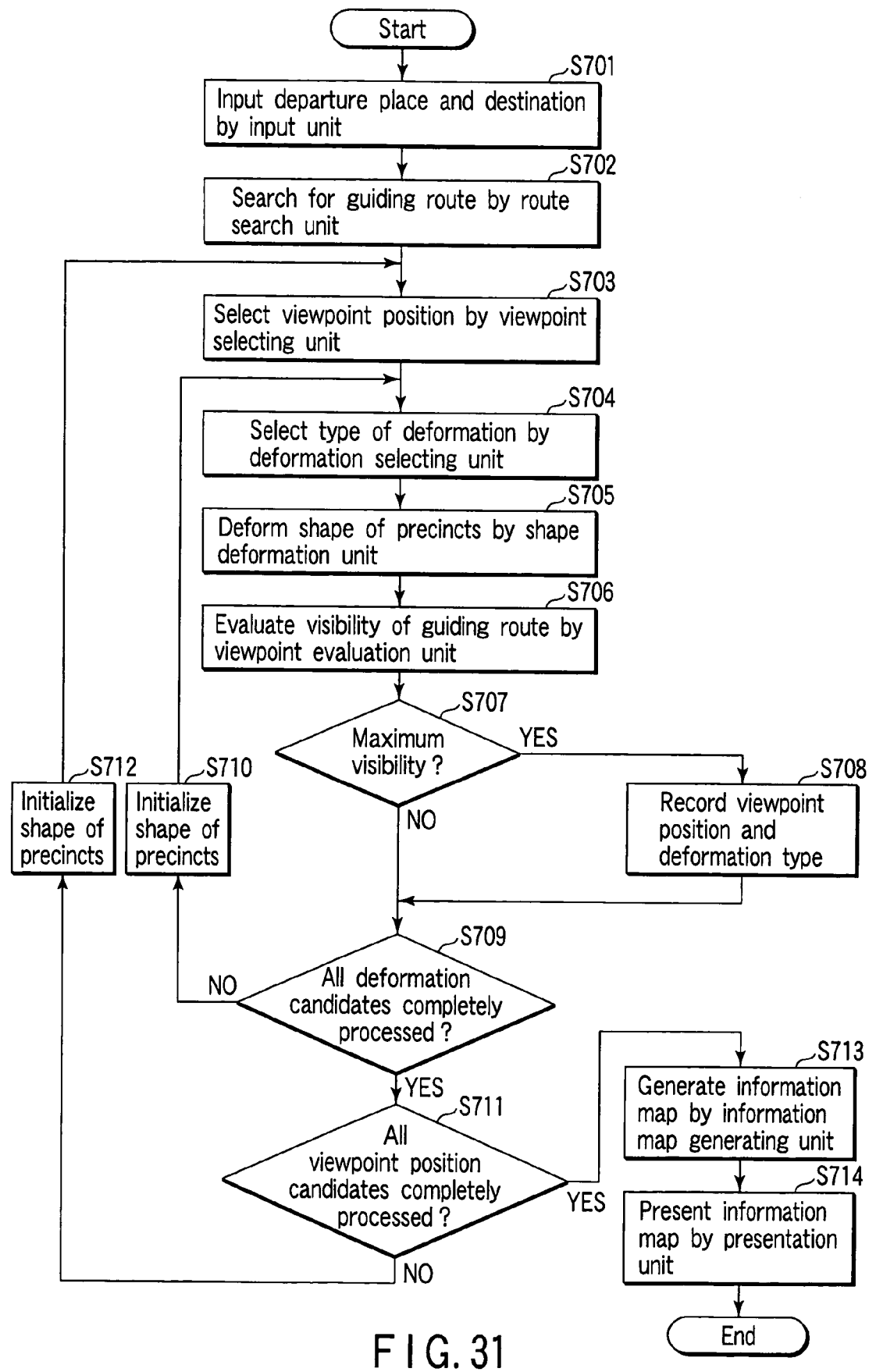
FIG. 31 is a flow chart showing an example of the flow of processing in the fifth embodiment.

FIG. 31 is a flow chart showing the processing sequence of the information map presenting apparatus of this embodiment. This flow chart is obtained by adding processing pertaining to a viewpoint selecting unit 10 and viewpoint evaluation unit 6 to the flow chart of the third embodiment shown in FIG. 28. Therefore, new steps S711 and S712 are added to the flow chart shown in FIG. 28, and step S708 is changed to step S708'. Loop processing related to the newly added steps S711 and S712 will be explained below.

As in the explanation of the third embodiment, the viewpoint selecting unit 10 selects a viewpoint position (step S704), and evaluates the visibility of each of all deformation candidates for the selected viewpoint position (steps S704 to S709).

When the visibility evaluation of all the deformation candidates for the viewpoint position is completed, whether there is another selectable viewpoint position (viewpoint position candidate), i.e., whether route deformation evaluation of all the viewpoint position candidates is completed is checked (step S711). If it is determined that a viewpoint position candidate remains, the shape of precincts stored for evaluation is initialized (step S712), another viewpoint position candidate is selected (step S703), and the processes in steps S704 to S709 are executed for this viewpoint position candidate. If it is determined that route deformation evaluation is executed for all the viewpoint position candidates, the flow leaves the loop processing.

An information map generating unit 9 then projects, from a viewpoint position (having the highest visibility) recorded in step S708', the three-dimensional shape of precincts subjected to a route deformation candidate (having the highest visibility) recorded in step S708', thereby generating an information map concerning a guiding route (step S713). A presentation unit 3 presents the generated information map to the user (step S714).

As described above, the precinct information map presenting apparatus of this embodiment quantitatively evaluates a deformation process with which the line of a guiding route is most clearly seen, for each selectable viewpoint position. Accordingly, it is possible to automatically and objectively determine which deformation process is optimum in which viewpoint position. As a consequence, in the precincts of a building such as a large station or underground mall having a number of floors, an information map which can be understood more easily than conventional maps can be generated and presented.

(Sixth Embodiment)

The sixth embodiment of the present invention will be described below.

In this embodiment, a function of selecting the type of deformation process in accordance with the size of an information map is added to the shape deformation unit 5 of the information map presenting apparatus of each of the second to fourth embodiments.

For example, when the information map presenting apparatus has a large display and can present a relatively large information map, the presentation is not complicated in many cases without performing the deformation process of deleting extra floors shown in FIGS. 20A and 20B, or the deformation process of deleting extra regions shown in FIGS. 21A and 21B. Likewise, a far portion of the guiding route can be clearly seen in many cases without performing the deformation process of rotating a far floor shown in FIGS. 25A and 25B, or the deformation process of curving a far floor shown in FIGS. 26A and 26B.

In contrast, when the information map presenting apparatus presents an information map on a user's portable terminal, the complexity must be eliminated by positively performing the deformation shown in FIGS. 20A and 20B or 21A and 21B. Similarly, a far portion of the guiding route must be made easy to see by effectively using the deformation shown in FIGS. 25A and 25B or 26A and 26B.

In this embodiment, therefore, a shape deformation unit 5 can accurately select the type of deformation process in accordance with the size of an information map.

The size of an information map may be input from an input unit 1 by a user, or a default size may be determined in accordance with the form of presentation of the information map presenting apparatus. Alternatively, the size of an information map may be automatically determined by a controller 2 in accordance with the form of presentation.

Consequently, an information map understandable more easily than conventional maps can be presented in the precincts of a building such as a large station or underground mall having a number of floors.

(Seventh Embodiment)

The seventh embodiment of the present invention will be described below.

In this embodiment, the information map generating unit 9 of the information map presenting apparatus of any of the first to fourth embodiments additionally has a function of adding a supplementary explanation to a partial route whose visibility evaluated by the viewpoint evaluation unit 6 does not satisfy a reference value.

For example, in FIG. 32A, a first floor portion and staircase portion of a guiding route are obstructed by the second floor, so the visibility of each of these partial routes is evaluated as low. In particular, an evaluation value of the staircase portion of the route is 0 because this portion is entirely obstructed.

In this embodiment, an information map generating unit 9 adds a supplementary explanation such as "Go upstairs" shown in FIG. 32B to a partial route, such as the staircase portion of the route described above, whose visibility evaluation value does not satisfy a predetermined reference value. This allows a user to understand the line of the guiding route.

Consequently, an information map understandable more easily than conventional maps can be presented in the precincts of a building such as a large station or underground mall having a number of floors.

(Eighth Embodiment)

The eighth embodiment of the present invention will be described below.

In this embodiment, the information map generating unit 9 of the information map presenting apparatus of any of the first, second, and fifth embodiments additionally has a function of generating information maps split from the start point or end point of a partial route whose visibility evaluated by the viewpoint evaluation unit 6 does not satisfy a reference value.

For example, in FIG. 33A, a first floor portion and staircase portion of a guiding route are obstructed by the second floor, so the visibility of each of these partial routes is evaluated as low. In particular, an evaluation value of the staircase portion of the route is 0 because this portion is entirely obstructed.

In this embodiment, an information map generating unit 9 generates a plurality of information maps split from the start point or end point of a partial route, such as the staircase portion of the route described above, whose visibility evaluation value does not satisfy a predetermined reference value. This allows a user to clearly see the line of the guiding route. For example, in FIG. 33B, two information maps split from the end point of the staircase portion of the route are generated.

Consequently, an information map understandable more easily than conventional maps can be presented in the precincts of a building such as a large station or underground mall having a number of floors.

Note that each of the above functions can be implemented as software.

Note also that the present invention may also be practiced as a program for allowing a computer to execute a predetermined means (or allowing a computer to function as a predetermined means, or to implement a predetermined function), or as a computer-readable recording medium recording the program.

The arrangement explained in each embodiment of the present invention is merely an example, so any arrangement other than those described above is not excluded. It is also possible to make another arrangement by replacing part of any of the explained arrangements with another component, omitting part of the arrangement, adding a function or element to the arrangement, or combining any of these replacement, omission, and addition. Another arrangement logically equivalent to any of the explained arrangements, another arrangement including a portion logically equivalent to any of the explained arrangements, and another arrangement logically equivalent to the main parts of any of the explained arrangements are also possible. Furthermore, another arrangement which achieves an object identical or similar to that of any of the explained arrangements, and another arrangement which achieves an effect identical or similar to that of any of the explained arrangements are possible.

Various variations of the individual components explained in the embodiments of the present invention can be practiced as appropriate combinations.

The embodiments of the present invention include inventions according to various standpoints, stages, concepts, and categories. Examples are an invention as a discrete apparatus, an invention of two or more related apparatuses, an invention as a whole system, an invention of an internal component of a discrete apparatus, and inventions of methods corresponding to these inventions.

Accordingly, inventions can be extracted, regardless of the explained arrangements, from the contents disclosed in the embodiments of the present invention.

The present invention is not limited to the embodiments described above, and can be various modified within the technical scope of the invention. It is also possible to implement the processing in the embodiments as a computer-executable program, and implement this program as a computer-readable storage medium. This storage medium can take any storage form as long as the medium can store the program and can be read by a computer. Examples are a magnetic disk, flexible disk, hard disk, optical disk (e.g., a CD-ROM, CD-R, or DVD), magneto-optical disk (e.g., an MO), and semiconductor memory.

Also, on the basis of designations by a program installed from the storage medium to a computer, an OS (Operating System) or database management software running on the computer, or MW (middleware) such as a network, can execute part of each processing for implementing the present invention.

Furthermore, the storage medium of the present invention is not limited to a medium separated from a computer, but includes a storage medium which downloads a program transmitted across, e.g., a LAN or the Internet and stores or temporarily stores the program.

Also, the number of storage media is not limited to one. That is, the storage medium of the present invention includes a case in which a plurality of media execute each processing of the present invention. In this case, each storage medium can take any of the above-mentioned forms.

A computer of the present invention executes each processing on the basis of the program stored in the storage medium. This computer can be, e.g., a single apparatus such as a personal computer, or a system in which a plurality of apparatuses are connected across a network.

Furthermore, a computer of the present invention is not limited to a personal computer but includes an arithmetic processing unit included in an information processing apparatus, a microcomputer, and the like. That is, a computer of the present invention is a general term for apparatuses and devices capable of implementing the functions of the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A guidance information providing apparatus comprising:
   a first memory which stores network data including line segment data representing a passage in a target area of route guidance in an information map and point data representing a connecting point of the passage;
   a second memory which stores three-dimensional shape data representing a three-dimensional shape of the target area;
   an input unit which inputs a departure place and destination;
   a guiding route search unit which searches the first memory to acquire a guiding route connecting the input departure place and destination, on the basis of the network data;
   a viewpoint setting unit which sets a plurality of viewpoint position candidates for visualizing the guiding route in the target area expressed in the three-dimensional shape data;
   an evaluation unit which obtains an evaluation value of visibility, from each of the viewpoint position candidates, of the guiding route in the target area expressed in the three-dimensional shape data;
   an information map generating unit which generates the information map by determining a viewpoint position for generating the information map from the plurality of viewpoint position candidates on the basis of the evaluation value of visibility and by projecting the three-dimensional shape data from the determined viewpoint position; and
   a presentation unit configured to present the generated information map to a user.

2. A guidance information providing apparatus comprising:
   a first memory which stores network data including line segment data representing a passage in a target area of route guidance in an information map and point data representing a connecting point of a passage;
   a second memory which stores three-dimensional shape data representing a three-dimensional shape of the target area;
   an input unit which inputs a departure place and destination;
   a guiding route search unit which searches the first memory to acquire a guiding route connecting the input departure place and destination, on the basis of the network data;
   a viewpoint setting unit which sets a viewpoint position for visualizing the guiding route in the target area expressed in the three-dimensional shape data;
   a deformation unit which deforms the three-dimensional shape data to improve visibility, from the selected viewpoint position, of the guiding route in the target area expressed in the three-dimensional shape data;
   an information map generating unit which generates the information map by projecting the deformed three-dimensional shape data; and
   a presentation unit configured to present a user with the information map generated by the information map generating unit.

3. A guidance information providing apparatus comprising:
   a first memory which stores network data including line segment data representing a passage in a target area of route guidance in an information map and point data representing a connecting point of a passage;
   a second memory which stores three-dimensional shape data representing a three-dimensional shape of the target area;
   an input unit which inputs a departure place and destination;
   a guiding route search unit which searches the first memory to acquire a guiding route connecting the input departure place and destination, on the basis of the network data;
   a viewpoint setting unit which sets a viewpoint position for the guiding route expressed in the three-dimensional shape data;
   a deformation unit which performs a plurality of deformation processes for deforming the three-dimensional shape data to improve visibility, from the selected viewpoint position, of the guiding route expressed in the three-dimensional shape data, to obtain a plurality of route deformation candidates;
   an evaluation unit which obtains an evaluation value of visibility, from the selected viewpoint position, of each of the route deformation candidates expressed in the three-dimensional shape data;
   an information map generating unit which generates the information map by determining route deformation for generating the information map from said plurality of route deformation candidates on the basis of the evaluation value of visibility of each of the route deformation candidates and by projecting, from the selected viewpoint position, the three-dimensional shape data subjected to the determined route deformation; and
   a presentation unit configured to present the generated information map.

4. A guidance information providing apparatus comprising:
   a first memory which stores network data including line segment data representing a passage in a target area of route guidance in an information map and point data representing a connecting point of a passage;
   a second memory which stores three-dimensional shape data representing a three-dimensional shape of the target area;
   an input unit which inputs a departure place and destination;
   a guiding route search unit which searches the first memory to acquire a guiding route connecting the input departure place and destination, on the basis of the network data;
   a viewpoint setting unit which sets a plurality of viewpoint positions candidates for visualizing the guiding route expressed in the three-dimensional shape data;

a deformation unit which deforms the three-dimensional shape data to improve visibility, from each of the viewpoint position candidates, of the guiding route in the target area expressed in the three-dimensional shape data;

an evaluation unit which obtains an evaluation value of visibility, from each of the viewpoint position candidates, of the guiding route in the target area expressed in the deformed three-dimensional shape data;

an information map generating unit which generates the information map by determining a viewpoint position for generating the information map from said plurality of viewpoint position candidates on the basis of the evaluation values of visibility and by projecting the deformed three-dimensional shape data from the determined viewpoint position; and a presentation unit configured to present a user with the information map generated by the information map generating unit.

5. A guidance information providing apparatus comprising:

a first memory which stores network data including line segment data representing a passage in a target area of route guidance in an information map and point data representing a connecting point of a passage;

a second memory which stores three-dimensional shape data representing a three-dimensional shape of the target area;

an input unit which inputs a departure place and destination;

a guiding route search unit which searches the first memory to acquire a guiding route connecting the input departure place and destination, on the basis of the network data;

a viewpoint setting unit which sets a plurality of viewpoint positions candidates for expressing and visualizing the guiding route in the three-dimensional shape data;

a deformation unit which performs a deformation process for deforming the three-dimensional shape data to improve visibility, from each of the viewpoint position candidates, of the guiding route expressed in the three-dimensional shape data, to obtain a plurality of route deformation candidates for each viewpoint position candidate;

an evaluation unit which obtains an evaluation value of visibility, from each of the viewpoint position candidate, of each of the route deformation candidates expressed in the three-dimensional shape data;

an information map generating unit which generates the information map by determining a viewpoint position for generating the information map from said plurality of viewpoint position candidates and route deformation for generating the information map from said plurality of route deformation candidates on the basis of the obtained evaluation values of visibility, and by projecting, from the determined viewpoint position, the three-dimensional shape data subjected to the route deformation; and a presentation unit configured to present a user with the information map generated by the information map generating unit.

6. An apparatus according to claim 5, wherein the deformation unit performs, as the deformation process, at least a process of extracting and deleting a portion which obstructs the guiding route from the three-dimensional shape data stored in the second memory.

7. An apparatus according to claim 5, wherein the deformation unit performs, as the deformation process, at least a process of extracting and deleting a portion representing a floor which does not include any of the departure place, destination, and guiding route from the three-dimensional data.

8. An apparatus according to claim 5, wherein the deformation unit performs, as the deformation process, at least a process of extracting and deleting a portion representing a region which does not include any of the departure place, destination, and guiding route from the three-dimensional data.

9. An apparatus according to claim 5, wherein the deformation unit performs, as the deformation process, at least a process of extracting a portion representing a floor which obstructs the guiding route from the three-dimensional data, and moving the portion by a predetermined distance in a predetermined direction.

10. An apparatus according to claim 5, wherein the deformation unit performs, as the deformation process, at least a process of extracting a portion representing a floor which obstructs the guiding route, and a portion representing an obstructed floor, from the three-dimensional data, and rotating the portions by a predetermined angle around a predetermined axis.

11. An apparatus according to claim 5, wherein the deformation unit performs, as the deformation process, at least a process of extracting a portion representing a floor which obstructs the guiding route from the three-dimensional data, and curving the portion in a predetermined form.

12. An apparatus according to claim 5, wherein the deformation unit performs, as the deformation process, at least a process of extracting a floor including a portion positioned far from a viewpoint from the three-dimensional data, and rotating the floor by a predetermined angle around a predetermined axis.

13. An apparatus according to claim 5, wherein the deformation unit performs, as the deformation process, at least a process of extracting a floor including a portion positioned far from a viewpoint from the three-dimensional data, and curving the floor in a predetermined form.

14. An apparatus according to claim 5, wherein the deformation unit selects a type of deformation process to be performed on the basis of a size of the information map.

15. An apparatus according to claim 5, wherein the deformation unit selects a type of deformation process to be performed on the basis of an evaluation value of visibility, from the viewpoint position, of the guiding route expressed in the three-dimensional data.

16. An apparatus according to claim 5, wherein the deformation unit selects a type of deformation process to be performed on the basis of an instruction from a user.

17. An apparatus according to claim 5, wherein if a guiding route included in a generated information map has a partial route having the visibility evaluation value which does not satisfy a predetermined reference value, the information map generating unit adds, to the information map, information indicating a supplementary explanation related to the partial route.

18. An apparatus according to claim 5, wherein if a guiding route included in a generated information map has a partial route having the visibility which does not satisfy a predetermined reference value, the information map generating unit splits the information map from the partial route.

19. An apparatus according to claim 5, wherein the evaluation unit obtains an evaluation value of visibility of a route surface of a route of the guiding route, except for a route connecting floors, on the basis of a size of a visible projected area.

20. An apparatus according to claim 19, wherein the evaluation unit obtains an evaluation value of visibility of a virtual route surface, which is formed perpendicularly to a route connecting floors, of the guiding route, on the basis of a size of a visible projected area.

21. An apparatus according to claim 5, wherein polygon mesh data is used as the three-dimensional shape data.

22. A guidance information providing method to provide guidance information, comprising:
preparing network data including line segment data representing a passage in a target area of route guidance in an information map and point data representing a connecting point of a passage, and three-dimensional shape data representing a three-dimensional shape of the target area;
inputting a departure place and destination;
searching for a guiding route connecting the input departure place and destination, on the basis of the network data;
setting a plurality of viewpoint position candidates for visualizing the guiding route expressed in the three-dimensional shape data;
obtaining an evaluation value of visibility, from each viewpoint position candidate, of the guiding route in the target area expressed in the three-dimensional shape data;
determining a viewpoint position for generating the information map from the plurality of viewpoint position candidates, on the basis of the evaluation value of visibility from each viewpoint position candidate;
generating the information map by projecting the three-dimensional shape data from the determined viewpoint position; and
presenting the generated information map to a user.

23. A guidance information providing method comprising:
preparing network data including line segment data representing a passage in a target area of route guidance in an information map and point data representing a connecting point of a passage, and three-dimensional shape data representing a three-dimensional shape of the target area;
inputting a departure place and destination;
searching for a guiding route connecting the input departure place and destination, on the basis of the network data;
setting a viewpoint position for visualizing the guiding route expressed in the three-dimensional shape data;
deforming the three-dimensional shape data so as to improve visibility, from the selected viewpoint position, of the guiding route expressed in the three-dimensional shape data;
generating the information map by projecting the deformed three-dimensional shape data; and
presenting a user with the information map generated by the information map generating unit.

24. A guidance information providing method comprising:
preparing network data including line segment data representing a passage in a target area of route guidance in an information map and point data representing a connecting point of a passage, and three-dimensional shape data representing a three-dimensional shape of the target area;
inputting a departure place and destination;
searching for a guiding route connecting the input departure place and destination, on the basis of the network data;
setting a viewpoint position for the guiding route expressed in the three-dimensional shape data;
performing a plurality of deformation processes for the three-dimensional shape data to improve visibility, from the selected viewpoint position, of the guiding route expressed in the three-dimensional shape data, to obtain a plurality of route deformation candidates;
obtaining an evaluation value of visibility, from the selected viewpoint position, of each of the route deformation candidates expressed in the three-dimensional shape data;
determining route deformation for generating the information map from said plurality of route deformation candidates, on the basis of the evaluation value of visibility of each of the route deformation candidates;
generating the information map by projecting, from the selected viewpoint position, the three-dimensional shape data subjected to the determined route deformation; and
presenting the generated information map.

25. A guidance information providing method comprising:
preparing network data including line segment data representing a passage in a target area of route guidance in an information map and point data representing a connecting point of a passage, and three-dimensional shape data representing a three-dimensional shape of the target area;
inputting a departure place and destination;
searching for a guiding route connecting the input departure place and destination, on the basis of the network data;
setting a plurality of viewpoint positions for visualizing the guiding route expressed in the three-dimensional shape data;
deforming the three-dimensional shape data to improve visibility, from each of the viewpoint position candidates, of the guiding route expressed in the three-dimensional shape data;
obtaining an evaluation value of visibility, from each of the viewpoint position candidates, of the guiding route expressed in the deformed three-dimensional shape data;
determining a viewpoint position for generating the information map from said plurality of viewpoint position candidates, on the basis of the evaluation values of visibility;
generating the information map by projecting the deformed three-dimensional shape data from the determined viewpoint position; and
presenting a user with the information map generated by the information map generating unit.

26. A guidance information providing method comprising:
preparing network data including line segment data representing a passage in a target area of route guidance in an information map and point data representing a connecting point of a passage, and three-dimensional shape data representing a three-dimensional shape of the target area;
inputting a departure place and destination;

searching for a guiding route connecting the input departure place and destination, on the basis of the network data;

setting a plurality of viewpoint positions for expressing and visualizing the guiding route in the three-dimensional shape data;

performing a deformation process for the three-dimensional shape data to improve visibility, from each of the viewpoint position candidates, of the guiding route expressed in the three-dimensional shape data, to obtain a plurality of route deformation candidates for each viewpoint position candidate;

obtaining an evaluation value of visibility, from each viewpoint position candidate, of each of the route deformation candidates expressed in the three-dimensional shape data;

determining a viewpoint position for generating the information map from said plurality of viewpoint position candidates, and route deformation for generating the information map from said plurality of route deformation candidates, on the basis of the obtained evaluation values of visibility;

generating the information map by projecting, from the determined viewpoint position, the three-dimensional shape data subjected to the route deformation; and presenting a user with the information map generated by the information map generating unit.

27. A computer program product storing a program for allowing a computer to function as a guidance information providing apparatus, the computer program product including:

means for storing network data including line segment data representing a passage in a target area of route guidance in an information map and point data representing a connecting point of a passage;

means for strong three-dimensional shape data representing a three-dimensional shape of the target area;

means for inputting a departure place and destination;

means for searching for a guiding route connecting the input departure place and destination, on the basis of the network data;

means for setting a plurality of viewpoint position candidates for visualizing the guiding route expressed in the three-dimensional shape data;

means for obtaining an evaluation value of visibility, from each viewpoint position candidate, of the guiding route expressed in the three-dimensional shape data;

means for determining a viewpoint position for generating the information map from said plurality of viewpoint position candidates, on the basis of the evaluation value of visibility from each viewpoint position candidate;

means for generating the information map by projecting the three-dimensional shape data from the determined viewpoint position; and means for presenting the generated information map to a user.

28. A computer program product storing a program for allowing a computer to function as a guidance information providing apparatus, the computer program product including:

means for storing network data including line segment data representing a passage in a target area of route guidance in an information map and point data representing a connecting point of a passage;

means for storing three-dimensional shape data representing a three-dimensional shape of the target area;

means for inputting a departure place and destination;

means for searching for a guiding route connecting the input departure place and destination, on the basis of the network data;

means for setting a viewpoint position for visualizing the guiding route expressed in the three-dimensional shape data;

means for deforming the three-dimensional shape data to improve visibility, from the selected viewpoint position, of the guiding route expressed in the three-dimensional shape data;

means for generating the information map by projecting the deformed three-dimensional shape data; and a presenting function which presents a user with the information map generated by the information map generating unit.

29. A computer program product storing a program for allowing a computer to function as a guidance information providing apparatus, the computer program product including:

means for storing network data including line segment data representing a passage in a target area of route guidance in an information map and point data representing a connecting point of a passage;

means for storing three-dimensional shape data representing a three-dimensional shape of the target area;

means for inputting a departure place and destination;

means for searching for a guiding route connecting the input departure place and destination on the basis of the network data;

means for setting a viewpoint position for the guiding route expressed in the three-dimensional shape data;

means for performing a plurality of deformation processes for the three-dimensional shape data to improve visibility, from the selected viewpoint position, of the guiding route expressed in the three-dimensional shape data, to obtain a plurality of route deformation candidates;

means for obtaining an evaluation value of visibility, from the selected viewpoint position, of each of the route deformation candidates expressed in the three-dimensional shape data;

means for determining route deformation for generating the information map from said plurality of route deformation candidates, on the basis of the evaluation value of visibility of each of the route deformation candidates;

means for generating the information map by projecting, from the selected viewpoint position, the three-dimensional shape data subjected to the determined route deformation; and a presenting function which presents the generated information map.

30. A computer program product storing a program for allowing a computer to function as a guidance information providing apparatus, the computer program product comprising:

means for storing network data including line segment data representing a passage in a target area of route guidance in an information map and point data representing a connecting point of a passage;

means for storing three-dimensional shape data representing a three-dimensional shape of the target area;

means for inputting a departure place and destination;

means for searching for a guiding route connecting the input departure place and destination on the basis of the network data;

means for selecting a plurality of viewpoint positions for visualizing the guiding route expressed in the three-dimensional shape data;

means for deforming the three-dimensional shape data to improve visibility, from each of the viewpoint position candidates, of the guiding route expressed in the three-dimensional shape data;

means for obtaining an evaluation value of visibility, from each of the viewpoint position candidates, of the guiding route expressed in the deformed three-dimensional shape data;

means for determining a viewpoint position for generating the information map from said plurality of viewpoint position candidates on the basis of the evaluation values of visibility;

means for generating the information map by projecting the deformed three-dimensional shape data from the determined viewpoint position; and means for presenting a user with the information map generated by the information map generating unit.

31. A computer program product storing a program for allowing a computer to function as a guidance information providing apparatus, the computer program product including:

means for storing network data including line segment data representing a passage in a target area of route guidance in an information map and point data representing a connecting point of a passage;

means for storing three-dimensional shape data representing a three-dimensional shape of the target area;

means for inputting a departure place and destination;

means for searching for a guiding route connecting the input departure place and destination on the basis of the network data;

means for selecting a plurality of viewpoint positions for expressing and visualizing the guiding route in the three-dimensional shape data;

means for performing a deformation process for the three-dimensional shape data so as to improve visibility, from each of the viewpoint position candidates, of the guiding route expressed in the three-dimensional shape data, to obtain a plurality of route deformation candidates for each viewpoint position candidate;

means for obtaining an evaluation value of visibility, from each viewpoint position candidate, of each of the route deformation candidates expressed in the three-dimensional shape data;

means for determining a viewpoint position for generating the information map from the plurality of viewpoint position candidates, and route deformation for generating the information map from said plurality of route deformation candidates, on the basis of the obtained evaluation values of visibility;

means for generating the information map by projecting, from the determined viewpoint position, the three-dimensional shape data subjected to the route deformation; and means for presenting a user with the information map generated by the information map generating unit.

32. A server apparatus adapted to communicate with a client apparatus, comprising:

a first memory which stores network data including line segment data representing a passage in a target area of route guidance in an information map and point data representing a connecting point of a passage;

a second memory which stores three-dimensional shape data representing a three-dimensional shape of the target area;

a receiving unit which receives a departure place and destination from the client apparatus as a request source;

a guiding route search unit which searches the first memory to acquire a guiding route connecting the received departure place and destination, on the basis of the network data;

a viewpoint setting unit which sets a plurality of viewpoint position candidates to visualize the guiding route in the target area expressed in the three-dimensional shape data;

an evaluation unit which obtains an evaluation value of visibility, from each viewpoint position candidate, of the guiding route expressed in the three-dimensional shape data;

an information map generating unit which generates the information map by determines a viewpoint position for generating the information map from said plurality of viewpoint position candidates on the basis of the evaluation value of visibility from each viewpoint position candidate, and by projecting the three-dimensional shape data from the determined viewpoint position; and a transmitting unit which transmits the generated information map to the client apparatus.

33. A server apparatus adapted to communicate with a client apparatus, comprising:

a first memory which stores network data including line segment data representing a passage in a target area of route guidance in an information map and point data representing a connecting point of a passage;

a second memory which stores three-dimensional shape data representing a three-dimensional shape of the target area;

a receiving unit which receives a departure place and destination from the client apparatus as a request source;

a guiding route search unit which searches the first memory to acquire a guiding route connecting the received departure place and destination on the basis of the network data;

a viewpoint setting unit which sets a viewpoint position to visualize the guiding route in the target area expressed in the three-dimensional shape data;

a deformation unit which deforms the three-dimensional shape data to improve visibility, from the selected viewpoint position, of the guiding route expressed in the three-dimensional shape data;

an information map generating unit which generates the information map by projecting the deformed three-dimensional shape data; and a transmitting unit which transmits the generated information map to the client apparatus.

34. A server apparatus adapted to communicate with a client apparatus, comprising:

a first memory which stores network data including line segment data representing a passage in a target area of route guidance in an information map and point data representing a connecting point of a passage;

a second memory which stores three-dimensional shape data representing a three-dimensional shape of the target area;

a receiving unit which receives a departure place and destination from the client apparatus as a request source;

a guiding route search unit which searches the first memory to acquire a guiding route connecting the received departure place and destination, on the basis of the network data;

a viewpoint setting unit which sets a viewpoint position for the guiding route expressed in the three-dimensional shape data;

a deformation unit which performs a plurality of deformation processes for the three-dimensional shape data to improve visibility, from the selected viewpoint position, of the guiding route expressed in the three-dimensional shape data, to obtain a plurality of route deformation candidates;

an evaluation unit which obtains an evaluation value of visibility, from the selected viewpoint position, of each of the route deformation candidates expressed in the three-dimensional shape data;

an information map generating unit which generates the information map by determining route deformation for generating the information map from said plurality of route deformation candidates on the basis of the evaluation value of visibility of each of the route deformation candidates, and by projecting, from the selected viewpoint position, the three-dimensional shape data subjected to the determined route deformation; and a transmitting unit which transmits the generated information map to the client apparatus.

35. A server apparatus adapted to communicate with a client apparatus, comprising:

a first memory which stores network data including line segment data representing a passage in a target area of route guidance in an information map and point data representing a connecting point of a passage;

a second memory which stores three-dimensional shape data representing a three-dimensional shape of the target area;

a receiving unit which receives a departure place and destination from a client apparatus as a request source;

a guiding route search unit which searches the first memory to acquire a guiding route connecting the received departure place and destination, on the basis of the network data;

a viewpoint setting unit which sets a plurality of viewpoint positions to visualize the guiding route expressed in the three-dimensional shape data;

a deformation unit which deforms the three-dimensional shape data to improve visibility, from each of the viewpoint position candidates, of the guiding route expressed in the three-dimensional shape data;

an evaluation unit which obtains an evaluation value of visibility, from each of the viewpoint position candidates, of the guiding route expressed in the deformed three-dimensional shape data;

an information map generating unit which generates the information map by determining a viewpoint position for generating the information map from said plurality of viewpoint position candidates on the basis of the evaluation values of visibility, and by projecting the deformed three-dimensional shape data from the determined viewpoint position; and a transmitting unit which transmits the generated information map to the client apparatus.

36. A server apparatus adapted to communicate with a client apparatus, comprising:

a first memory which stores network data including line segment data representing a passage in a target area of route guidance in an information map and point data representing a connecting point of a passage;

a second memory which stores three-dimensional shape data representing a three-dimensional shape of the target area;

a receiving unit which receives a departure place and destination from a client apparatus as a request source;

a guiding route search unit which searches the first memory to acquire a guiding route connecting the received departure place and destination on the basis of the network data;

a viewpoint setting unit which sets a plurality of viewpoint positions for expressing and visualizing the guiding route in the three-dimensional shape data;

a deformation unit which performs a deformation process for the three-dimensional shape data to improve visibility, from each of the viewpoint position candidates, of the guiding route expressed in the three-dimensional shape data, to obtain a plurality of route deformation candidates for each viewpoint position candidate;

an evaluation unit which obtains an evaluation value of visibility, from each viewpoint position candidate, of each of the route deformation candidates expressed in the three-dimensional shape data;

an information map generating unit which generates the information map by determining a viewpoint position for generating the information map from said plurality of viewpoint position candidates, and route deformation for generating the information map from said plurality of route deformation candidates, on the basis of the obtained evaluation values of visibility, and by projecting, from the determined viewpoint position, the three-dimensional shape data subjected to the route deformation; and a transmitting unit which transmits the generated information map to the client apparatus.

* * * * *